(12) United States Patent
Haas et al.

(10) Patent No.: US 12,101,118 B2
(45) Date of Patent: Sep. 24, 2024

(54) LIGHT COMMUNICATION SYSTEM AND METHOD

(71) Applicant: pureLiFi Limited, Edinburgh (GB)

(72) Inventors: Harald Ulrich Haas, Edinburgh (GB); Zhihong Zeng, Edinburgh (GB); Roger James Brook Jellicoe, Edinburgh (GB)

(73) Assignee: PURELIFI LIMITED, Edinburgh (GB)

( * ) Notice: Subject to any disclaimer, the term of this patent is extended or adjusted under 35 U.S.C. 154(b) by 61 days.

(21) Appl. No.: 17/613,293

(22) PCT Filed: May 29, 2020

(86) PCT No.: PCT/EP2020/065072
§ 371 (c)(1),
(2) Date: Nov. 22, 2021

(87) PCT Pub. No.: WO2020/240016
PCT Pub. Date: Dec. 3, 2020

(65) Prior Publication Data
US 2022/0224414 A1 Jul. 14, 2022

(30) Foreign Application Priority Data
May 29, 2019 (GB) ..................... 1907574

(51) Int. Cl.
*H04B 10/00* (2013.01)
*G02B 27/01* (2006.01)
(Continued)

(52) U.S. Cl.
CPC ....... *H04B 10/1149* (2013.01); *G02B 27/017* (2013.01); *H04B 10/116* (2013.01); *H04B 10/27* (2013.01); *H04B 10/572* (2013.01)

(58) Field of Classification Search
CPC ... H04B 10/11; H04B 10/112; H04B 10/1123; H04B 10/114; H04B 10/1143;
(Continued)

(56) References Cited

U.S. PATENT DOCUMENTS

| 3,566,126 A * | 2/1971 | Lang ................ H04B 10/1125 359/245 |
| 7,035,546 B2 * | 4/2006 | Keller ................ H04B 10/2587 378/170 |

(Continued)

FOREIGN PATENT DOCUMENTS

| GB | 2375249 A | 11/2002 |
| GB | 2499693 A | 8/2013 |
| WO | 9611536 A1 | 4/1996 |

OTHER PUBLICATIONS

Brandon Born, et al. "All-optical retro-modulation for free-space optical communication.", Feb. 1, 2018., Optics Express, vol. 26, No. 4., p. 5031-5042, https://doi.org/10.1364/OE.26.005031.

(Continued)

*Primary Examiner* — Hanh Phan
(74) *Attorney, Agent, or Firm* — SNELL & WILMER L.L.P.

(57) ABSTRACT

An optical wireless communication (OWC) system comprises: an access point (AP) comprising a plurality of OWC transmitters and a plurality of OWC receivers; a station (STA) comprising at least one retroreflector; and a controller configured to control the OWC AP transmitters and/or OWC AP receivers; wherein the controller is configured to process data representative of at least one OWC signal that is received by at least one of the OWC AP receivers after having been transmitted by at least one of the OWC AP transmitters and reflected by the at least one retroreflector; and the controller is configured to activate and/or deactivate at least one of the OWC AP transmitters and/or OWC AP (Continued)

receivers based on the processing of the data that is representative of the received at least one OWC signal.

25 Claims, 6 Drawing Sheets

(51) Int. Cl.
```
H04B 10/114      (2013.01)
H04B 10/116      (2013.01)
H04B 10/27       (2013.01)
H04B 10/572      (2013.01)
```
(58) Field of Classification Search
CPC .. H04B 10/1149; H04B 10/116; H04B 10/40; H04B 10/27; H04B 10/572; H04B 10/0795; G02B 27/017
USPC ....... 398/118, 119, 120, 121, 122, 124, 125, 398/126, 127, 128, 129, 130, 131, 135, 398/136, 33, 38, 158, 159, 172, 169, 170
See application file for complete search history.

(56) References Cited

U.S. PATENT DOCUMENTS

| | | | |
|---|---|---|---|
| 8,160,454 B2* | 4/2012 | Shimada | H04B 10/11 398/172 |
| 9,118,420 B2 | 8/2015 | Kwon et al. | |
| 9,838,119 B1 | 12/2017 | Stein et al. | |
| 10,027,410 B2 | 7/2018 | Rains et al. | |
| 10,122,454 B2 | 11/2018 | Rains, Jr. et al. | |
| 2001/0043381 A1* | 11/2001 | Green | H04B 10/2587 398/126 |
| 2008/0219671 A1 | 9/2008 | Schmitt | |
| 2017/0102545 A1 | 4/2017 | Hua et al. | |
| 2018/0063674 A1 | 3/2018 | Hershey et al. | |
| 2018/0097536 A1 | 4/2018 | Pederson | |

OTHER PUBLICATIONS

Zizheng Cao, et al. "200 Gbps OOK Transmission over an Indoor Optical Wireless Link Enabled by an Integrated Cascaded Aperture Optical Receiver.", 2017, Optical Fiber Communications Conference and Exhibition (OFC), ISBN: 978-1-9435-8023-1.
Cheng Chen, et al. "Efficient Analytical Calculation of Non-Line-of-Sight Channel Impulse Response in Visible Light Communications", May 1, 2018, Journal of Lightwave Technology, vol. 36, No. 9, p. 1666-1682, DOI: 10.1109/JLT.2017.2786459.
Zhe Chen, "Interference Mitigation Techniques for Optical Attocell Networks.", 2016, PHD Thesis, University of Edinburgh, https://www.era.lib.ed.ac.uk/handle/1842/22868.
Eliane Coser, et al. "Development of paints with infrared radiation reflective properties.", 2015, Polímeros, vol. 25, No. 3, p. 305-310, http://dx.doi.org/10.1590/0104-1428.1869.
Ariel Gomez, et al. "Design and Demonstration of a 400 Gb/s Indoor Optical Wireless Communications Link.", 2016, Journal of Lightwave Technology, vol. 34, No. 22, p. 5332-5339, DOI: 10.1109/JLT.2016.2616844.
Gomez Agis, et al. "112 Gbit/s Transmission in a 2D Beam Steering AWGBased Optical Wireless Communication System.", 2017, 43rd European Conference on Optical Communication, ECOC 2017, DOI: 10.1109/ECOC.2017.8346059.
Ton Koonen, et al. "High-Capacity Optical Wireless Communication Using Two-Dimensional IR Beam Steering.", 2018, Journal of Lightwave Technology, vol. 36, No. 19, p. 4486-4493, DOI: 10.1109/JLT.2018.2834374.

David M. Hyde, et al. "Investigation of Infrared Reflective Pigmentation Technologies for Coatings and Composite Applications.", 1905, PROCEEDINGS, American Composites Manufacturers Association Composites and Polycon, p. 37.
Stephan Saur, et al. "Grid-of-Beams (GoB) Based Downlink Multi-User MIMO.", 2008, IEEE 802.16 Broadband Wireless Access Working Group <http://ieee802.org/16>, IEEE C802.16m-08/487.
Ton Koonen, "Optical Wireless Systems: Technology, Trends and Applications.", 2018, IEEE Photonics Webinar, PowerPoint.
Klaus-Dieter Langer, et al. "Optical Wireless Indoor Networks: Recent Implementation Efforts.", 2010, 36th European Conference and Exhibition on Optical Communication, DOI: 10.1109/ECOC.2010.5621583.
Angli Liu, et al. "Retro-VLC: Enabling Low-power Duplex Visible Light Communication.", 2016, HotMobile '15 Proceedings of the 16th International Workshop on Mobile Computing Systems and Applications, p. 21-26, doi>10.1145/2699343.2699354.
Olivier Bouchet, et al. "Terabit per Second Optical Wireless Links for Virtual Reality Technology.", 2018, Proceedings vol. 10770, Laser Communication and Propagation through the Atmosphere and Oceans VII, https://doi.org/10.1117/12.2319834.
Omid Abari. "Cutting the Cord in Virtual Reality.", 2016, HotNets '16 Proceedings of the 15th ACM Workshop on Hot Topics in Network. p. 162-168, doi>10.1145/3005745.3005770.
Yang Qiu, "Channel modeling for visible light communications-a survey.", 2016, Wireless Communications and Mobile Computing, p. 2016-2034, https://doi.org/10.1002/wcm.2665.
C. Quintana, "High Speed Electro-absorption Modulator for Long Range Retroreflective Free Space Optics." 2017, p. 707-210, DOI: 10.1109/LPT.2017.2680842.
Sihua Shao, "RETRO: Retroreflector Based Visible Light Indoor Localization for Real-time Tracking of Lot Devices.", 2018, IEEE International Conference on Computer Communications (INFOCOM), DOI: 10.1109/INFOCOM.2018.8485817.
Qualcomm Inc, "VR and AR pushing connectivity limits", May 1, 2017.
L.V. Wake, et al. "Formulating Infrared Coatings for Defence Applications.", 1993, p. 33-36, MRL Research Report: AR No. 008-254, https://catalogue.nla.gov.au/Record/2835661.
Dehao Wu, et al. "Optimisation of Lambertian order for indoor nondirected optical wireless communication.", 2012, ICCC 2012:First IEEE International Conference on Communication in China, http://dx.doi.org/10.1109/ICCCW.2012.6316472.
Holde Moench, et al. "High power VCSEL systems and applications", 2015, SPIE LASE, Proc. of SPIE vol. 9348, https://doi.org/10.1117/12.2076267.
International Searching Authority, Partial Search Report in International Application No. PCT/ EP2020/065072 dated May 29, 2020.
International Searching Authority, International Search Report and Written Opinion in International Application No. PCT/EP2020/065072 dated May 29, 2020.
International Searching Authority, International Preliminary Report in International Application No. PCT/ EP2020/065072 dated May 29, 2020.
International Search Report and Written Opinion issued in PCT/EP2020/65072 on Nov. 18, 2020.
Partial Search Report issued in PCT/EP2020/65072 on Sep. 23, 2020.
CNIPA, First Chinese Office Action dated Oct. 11, 2023 in Application No. 202080053294.8.
European Patent Office, European Office Action dated Nov. 23, 2023 in Application No. 20730015.3.
Korean Intellectual Property Office, Korean Office Action dated Jul. 12, 2024 in Application No. 10-2021-7041481.

* cited by examiner

LIGHT COMMUNICATION SYSTEM AND METHOD

CROSS-REFERENCE TO RELATED APPLICATIONS

This application is a national stage application of PCT/EP2020/065072, filed on May 29, 2020, entitled "LIGHT COMMUNICATION SYSTEM AND METHOD," which claims priority to UK Application No. 1907574.6, filed on May 29, 2019, both of which are hereby incorporated by reference in their entirety for all purposes.

FIELD

The present invention relates to an optical wireless communication system, for example a LiFi system.

BACKGROUND

Currently, there is significant interest in wireless virtual reality (VR), mixed reality (MR), augmented reality (AR) and high definition television (HD TV) from both industry and academia. In part, this interest is being driven by the opportunities provided by 5G networks and cloud computing. However, current VR and HD TV systems may suffer from a number of challenges and technical bottlenecks, falling short of providing a system that offers the high-throughput, reliability and low latency wireless communication required for the 'Quality of Experience' (QoE) consumers demand now and in the future.

A number of solutions, both wired and wireless, have been presented to achieve multiple Gbps with low latency rates in VR and MR systems. ~20 ms of latency is generally recommended as the limit of acceptable user detectability. Some references conclude that some people hardly notice 100 ms latency while others can perceive down to 3-4 ms latency.

With respect to HD TV, 8 k TVs require a data rate for 146 Gbps. Higher resolution systems are in development, for example 16 k systems.

5G

Using 5G, Verizon, Vodafone, and Huawei (March 2018) demonstrated how low latency will radically improve wireless video, video games, and VR, focusing on just a few of the industries 5G will transform over the next few years. They quote a latency of 1 to 2 ms for a data rate of 0.1 to 5.0 Gbps.

For wireless applications such as VR to be commercially viable, they are likely to require simultaneous multi-gigabit per second (Gbps), bi-directional wireless transmission to a plurality of mobile devices. These devices might not be aligned to the transmitter.

SUMMARY OF INVENTION

In a first aspect, there is provided an optical wireless communication (OWC) system comprising:
a first apparatus comprising a plurality of OWC transmitters and a plurality of OWC receivers;
a second apparatus comprising at least one reflector; and
a controller configured to control the OWC transmitters and/or OWC receivers of the first apparatus;
wherein the controller is configured to process data representative of at least one OWC signal that is received by at least one of the OWC receivers after having been transmitted by at least one of the OWC transmitters and reflected by the at least one reflector; and
the controller is configured to activate and/or deactivate at least one of the OWC transmitters and/or OWC receivers based on the processing of the data that is representative of the received at least one OWC signal.

The OWC system may provide multi-gigabit per second, bi-directional wireless transmission between the first apparatus and second apparatus.

The at least one reflector may comprise at least one retroreflector. The at least one retroreflector may comprise at least one solid corner cube retroreflector. The at least one retroreflector may comprise at least one of: retroreflective tape, a notched angle retroreflector, a hollow corner cube, a cat's eye, a solid corner cube, a ball mounted hollow retroreflector.

The first apparatus may comprise an access point (AP). The first apparatus may be configured to be substantially stationary. The first apparatus may be configured to occupy a fixed position. The first apparatus may be configured to be mounted to at least one of a table, a shelf, a wall, a ceiling. The first apparatus may comprise or form part of a control unit for an artificial reality (AR), mixed reality (MR) or augmented reality (AR) system. The first apparatus may be configured to deliver AR, MR or AR content to the second apparatus. The first apparatus may be configured to deliver to the second apparatus at least one of video, audio, graphics.

The first apparatus may be connected to a network by a network connection. The network may comprise at least one of the internet, a wide area network (WAN), a local area network (LAN). The network connection may comprise at least one of a wired connection, a wireless connection, a fibre-optic connection. The network connection may comprise at least one of an RF connection, an optical connection. The network connection may be based on standard networking protocols. The first apparatus may be configured to receive data from the internet and transmit the data received from the internet to the second apparatus. The first apparatus may be further configured to transmit data to at least one further apparatus in a mesh OWC network using a mesh OWC channel. The mesh OWC channel may be an infrared channel. A wavelength of the mesh OWC channel may be different from a wavelength used for transmission from the first apparatus to the second apparatus. A wavelength of the mesh OWC channel may be different from a wavelength of transmission from the second apparatus to the first apparatus.

The first apparatus may be configured to transmit data to the second apparatus using a first OWC channel. The first OWC channel may be a downlink channel. The first OWC channel may comprise a first infrared channel. The first infrared channel may have a wavelength around 1550 nm. The first infrared channel may have a wavelength around 850 nm. A wavelength of the channel for transmission on the mesh network may be different from a wavelength of the first infrared channel.

The second apparatus may comprise a station (STA). The second apparatus may comprise or form part of a mobile device. The second apparatus may comprise or form part of a mobile device for use in an artificial reality (AR), mixed reality (MR) or augmented reality (AR) system. The mobile device may comprise a head-mounted display (HMD). The mobile device may comprise glasses or goggles. The mobile device may comprise an ancillary user device. The mobile device may comprise at least one of a handheld controller, a simulated weapon, a hand movement tracker, a finger movement tracker, an audio device, a set of earphones, a vest, a sporting simulator, a stationary bicycle, a chair, a platform, a virtualizer, a VR adapter, a gaming mat. The mobile device may comprise a computing device, for example a laptop or tablet. The mobile device may comprise a mobile phone. The mobile device may comprise a television, for example a high-definition television (HD TV). The mobile device may comprise an Internet of Things (IoT) device.

The second apparatus may be configured to transmit data to the first apparatus using a second OWC channel. The second OWC channel may be an uplink channel. The second OWC channel may comprise a second infrared channel. The second infrared channel may have a wavelength around 1550 nm. The second infrared channel may have a wavelength around 850 nm.

The plurality of OWC transmitters may be spatially distributed on the first apparatus. The OWC receivers of the first apparatus may be associated with the OWC transmitters of the first apparatus such that each of the OWC receivers of the first apparatus is located in the vicinity of a respective one or more of the OWC transmitters of the first apparatus. The plurality of OWC transmitters of the first apparatus and plurality of OWC receivers of the first apparatus may be arranged as a plurality of units, each unit comprising at least one OWC transmitter and at least one OWC receiver. The plurality of OWC transmitters of the first apparatus and plurality of OWC receivers of the first apparatus may be arranged as a plurality of units, each unit comprising one OWC receiver and multiple OWC transmitters. The units may be arranged in a repeating pattern.

Each of the OWC transmitters of the first apparatus may comprise at least one light source that is configured to transmit data by modulation of transmitted light. Each light source may comprise at least one of a laser, a vertical-cavity surface-emitting laser (VCSEL). A field of view of each light source may be below 6°, further optionally below 5°, further optionally below 4°, further optionally below 3°, further optionally below 2°.

The OWC transmitters of the first apparatus may comprise a first type of transmitter and a second, different type of transmitter. In use, the first type of transmitter may be orientated towards a probable location of the second apparatus. The second type of transmitter may be oriented towards less probable locations of the second apparatus. The first type of transmitter may have a different field of view than the second type of transmitter, for example a larger field of view. The first type of transmitter may have different sensitivity than the second type of transmitter, for example higher sensitivity. The first type of transmitter may be capable of providing a different data rate than the second type of transmitter, for example a higher data rate. The first type of transmitter may have a different construction than the second type of transmitter.

The OWC receivers of the first apparatus may comprise a first type of OWC receiver configured to receive signals transmitted by the OWC transmitters of the first apparatus and reflected by the second apparatus. The first type of OWC receiver may be configured to receive on the first OWC channel, which may be a downlink channel. The first apparatus may further comprise OWC receivers of a second, different type of OWC receiver. The second type of OWC receiver may be configured to receive on the second OWC channel, which may be an uplink channel. The second type of OWC receiver may be configured to receive uplink signals directly from the second apparatus. The second type of OWC receiver may be of higher quality than the first type of receiver. OWC receivers of the second type of receiver may be larger than OWC receivers of the first type of receiver. The OWC receivers of the second type of receiver may be located outside a region of the first apparatus that is occupied by the transmitters and by the receivers of the first type of receiver.

Each of the OWC receivers of the first apparatus may comprise at least one of a single-photon avalanche diode (SPAD), an avalanche photodiode (APD), a PIN diode. Each of the OWC receivers of the first apparatus may be configured to receive a first wavelength of light and a second, different wavelength of light. The first wavelength may comprise a wavelength of the first OWC channel. The second wavelength may comprise a wavelength of the second OWC channel. The first apparatus may comprise circuitry configured to distinguish between reflected uplink signals and downlink signals.

The first apparatus may comprise a filter configured to receive the first and second wavelengths of light. The filter may comprise a notch filter. The filter may have two regions of reception.

The second apparatus may comprise at least one OWC transmitter. The or each OWC transmitter of the second apparatus may comprise at least one light source that is configured to transmit data by modulation of transmitted light. The or each light source may comprise at least one of a laser, a vertical-cavity surface-emitting laser (VCSEL).

The second apparatus may comprise at least one OWC receiver. The at least one OWC receiver of the second apparatus may be configured to receive signals transmitted by at least one of the plurality of OWC transmitters of the first apparatus. The or each OWC receiver of the second apparatus may comprise at least one of a single-photon avalanche diode (SPAD), an avalanche photodiode (APD), a PIN diode.

The at least one OWC transmitter of the second apparatus may comprise a plurality of second OWC transmitters. The at least one OWC receiver of the second apparatus may comprise a plurality of OWC receivers. The OWC transmitters of the second apparatus and/or OWC receivers of the second apparatus may be spatially distributed on the second apparatus. The OWC transmitters of the second apparatus and/or OWC receivers of the second apparatus may be distributed such as to provide coverage of a field of view during motion of the second apparatus. The field of view may comprise, for example, 90°.

The at least one reflector may be located on the second apparatus in the vicinity of the at least one OWC receiver of the second apparatus. The at least one reflector may comprise a plurality of reflectors surrounding the at least one OWC receiver of the second apparatus.

The at least one reflector may be configured to convert signals from a first wavelength to a second wavelength on reflection. The at least one reflector may be configured to convert signals from a wavelength of the first OWC channel to a wavelength of the second OWC channel. The at least one reflector may comprise a wavelength converting material. The wavelength converting material may comprise silicon germanium. The wavelength converting material may be configured to convert mid-infrared signals to near-infrared signals.

The at least one reflector may comprise an encoding apparatus configured to encode information on signals reflected by the at least one reflector. The information may comprise an identity. The identity may be an identity of the second apparatus. The encoding apparatus may comprise a liquid crystal display (LCD) shutter and drive circuitry. The encoding apparatus may comprise a modulator. The first apparatus may comprise a decoding apparatus configured to decode signals received from the at least one reflector.

The controller may be configured to use the at least one OWC signal to identify a user of the second apparatus. The identifying may comprise decoding information that was encoded on the signals by the encoding apparatus. The identifying may comprise power matrix interrogation. The controller may be configured to send different data to different users based on the identifying.

The controller may be configured to control the first apparatus to transmit the signal to the second apparatus using the at least one of the plurality of OWC transmitters of the first apparatus. The controller may be configured to control the first apparatus to transmit signals to the second apparatus using successive ones of the plurality of OWC transmitters of the first apparatus. The activating and/or deactivating of the at least one of the OWC transmitters of the first apparatus may be based on the processing of data that is representative of reflected signals that were transmitted from successive ones of the plurality of OWC transmitters of the first apparatus. The processing may comprise comparing reflected signals that were transmitted by different ones of the plurality of OWC transmitters of the first apparatus.

The controller may transmit signals sequentially from different ones of the OWC transmitters of the first apparatus in accordance with a transmission sequence. The transmission sequence may comprise transmitting from individual ones of the OWC transmitters of the first apparatus. The transmission sequence may comprise transmitting from subsets of the OWC transmitters of the first apparatus. The transmission sequence may start with transmitters orientated such as to be likely to be in the field of view of the second apparatus.

The activating and/or deactivating of the at least one of the OWC transmitters of the first apparatus may be in dependence on at least one characteristic of the reflected signal.

The at least one characteristic may comprise at least one of power, signal strength, RSSI (received signal strength indicator).

The activating of the at least one of the OWC transmitters may comprise activating an OWC transmitter for which a value for the at least one characteristic of the reflected signal received in response to transmission from said OWC transmission is above a threshold value. The deactivating of the at least one of the OWC transmitters may comprise deactivating an OWC transmitter for which a value for the at least one characteristic of the reflected signal receiver in response to transmission from said OWC transmission is below a threshold value.

The threshold value may be a combined threshold value. The value for the at least one characteristic may comprise a combined value for a subset of the plurality of OWC transmitters of the first apparatus. The threshold value of the characteristic may be a combined threshold value such as a combined target transmission rate and/or retroreflected signal power from a number of OWC transmitters of the first apparatus.

The activating and/or deactivating of the at least one of the OWC transmitters may be in dependence on a power consumption of the first apparatus.

The controller may be further configured to monitor an uplink rate and/or retroreflected power for signals received by at least one of the OWC receivers of the first apparatus. The uplink rate and/or retroreflected power may be used to predict and/or manage activity of at least one of the OWC transmitters of the first apparatus. The uplink rate and/or retroreflected power may be used to track a motion of the second apparatus.

The system may further comprise a reflector apparatus. The reflector apparatus may be configured to be stationary. The reflector apparatus may be configured to be substantially stationary. The reflector apparatus may be configured to occupy a fixed position. The reflector apparatus may occupy a position at least partially adjacent to a transmission and receiving region of the OWC first or second apparatus. The reflector apparatus may be configured to be mounted or suspended on or from or created on a wall or ceiling or floor.

The reflector apparatus may comprise at least one reflector or one or more reflective surface element.

At least part of the reflector apparatus may be formed by applying at least one reflective material to at least one surface, for example to a ceiling surface and/or a wall surface. The at least one reflective material may comprise at least one of reflective paint, infrared-reflective paint, titanium dioxide white pigmented composite. The at least one reflective material may have a high reflectivity at at least one of an uplink wavelength, a downlink wavelength. The at least one reflective material may have a high reflectivity at at least one of a wavelength of the first OWC channel, a wavelength of the second OWC channel. The at least one reflective material may be smooth. The at least one reflective material may allow for visible light absorption while maintaining infrared reflectivity. The at least one reflective material may have a reflectance above 50%, optionally above 60%, further optionally above 70%, further optionally above 80%, further optionally above 90%.

The at least one signal may comprise a first signal transmitted and received via a first transmission and reception path, and a second signal transmitted and received via a second transmission and reception path. The first and second signal may be sent by the same at least one of the OWC transmitters of the first apparatus. The first and second signal may be received by the same at least one of the OWC receivers of the first apparatus. The first transmission and reception path may comprise a direct path between the first apparatus and the second apparatus. The second transmission and reception path may comprise a reflected path in which the second signal is reflected from the reflector apparatus.

Processing the data representative of the at least one OWC signal may comprise comparing a characteristic of the first signal and second signal.

Activating an OWC transmitter of the first apparatus may comprise at least one of turning the OWC transmitter of the first apparatus on, waking the OWC transmitter of the first apparatus from sleep, for example by transmission of a signal from an external device or from the STA, changing the OWC transmitter of the first apparatus from a lower-power state to a higher-power state. Deactivating an OWC transmitter of the first apparatus may comprise at least one of turning the OWC transmitter of the first apparatus off, putting the OWC transmitter of the first apparatus into a sleep state, changing the OWC transmitter of the first apparatus from a higher-power state to a lower-power state.

The OWC transmitters of the first apparatus may be arranged such as to provide a grid of beams. The controller may be configured to select at least one beam of the grid of beams. The controller may be configured to provide an intracell handover between a first at least one beam of the grid of beams and a second at least one beam of the grid of beams.

The first apparatus may be configured simultaneously to transmit the same signal using multiple OWC transmitters of the plurality of OWC transmitters of the first apparatus. The first apparatus may be configured simultaneously to transmit different signals using different ones of the plurality of OWC transmitters of the first apparatus. The first apparatus may be configured to transmit data using Multiple Input Multiple Output (MIMO). The first apparatus may be configured to transmit data using a diversity scheme, optionally a spatial diversity scheme. The controller may be configured to provide an intracell handover between a first at least one transmission path and a second at least one transmission path.

The first apparatus may comprise a combiner configured to combine and/or multiplex signals received on different ones of the plurality of receivers.

The first apparatus may be a primary access point. The system may further comprise at least one secondary access point. The at least one secondary access point may be configured to provide a different field of view from the first access point. The at least one secondary access point may be configured to be powered by a lighting socket. The controller may be configured to control handover between a primary access point and a secondary access point.

The primary access point and the at least one secondary access point may be networked. The networking may be wired or wireless. The primary access point and the at least one secondary access point may be configured to perform synchronised transmission.

The or a controller may be configured to handover signal transmission between the primary access point and at least one secondary access point. The or a controller may be configured to designate one of the at least one secondary access point as a primary access point. The handover and/or the designating may be in dependence on at least one characteristic of reflected signals received by the first access point. The handover and/or the designating may be in dependence on at least one characteristic of reflected signals received by at least one secondary access point. The at least one secondary access point may form part of a mesh OWC network for transmission of data between devices using a mesh channel.

In a further aspect, which may be provided independently, there is provided an OWC method comprising:
transmitting by at least one of a plurality of OWC transmitters of a first apparatus an OWC signal;
reflecting by a reflector of a second apparatus the OWC signal;
receiving by at least one of a plurality of OWC receivers of the first apparatus the OWC signal; and
activating and/or deactivating at least one of the OWC transmitters and/or OWC receivers of the first apparatus based on processing of data that is representative of the received OWC signal.

In a further aspect, which may be provided independently, there is provided an apparatus comprising:
a plurality of OWC transmitters and a plurality of OWC receivers; and
a controller configured to control the OWC transmitters and/or the OWC receivers;
wherein the controller is configured to process data representative of at least one OWC signal that is received by at least one of the OWC receivers after having been transmitted by at least one of the OWC transmitters and reflected by at least one reflector external to the first apparatus; and
the controller is configured to activate and/or deactivate at least one of the OWC transmitters and/or at least one of the OWC receivers based on the processing of the data that is representative of the OWC signal.

In a further aspect, which may be provided independently, there is provided a controller for an OWC apparatus, wherein the controller is configured to:
process data representative of at least one OWC signal that is received by at least one of a plurality of OWC receivers of the OWC apparatus after having been transmitted by at least one of a plurality of OWC transmitters of the OWC apparatus and reflected by at least one reflector external to the first apparatus; and
activate and/or deactivate at least one of the OWC transmitters and/or at least one of the OWC receivers based on the processing of the data that is representative of the OWC signal.

In a further aspect, which may be provided independently, there is provided an apparatus comprising:
a plurality of OWC transmitters and a plurality of OWC receivers; and
a controller configured to:
control the OWC transmitters so as to sequentially transmit OWC signals from different ones of the OWC transmitters in accordance with a transmission sequence, wherein the different ones of the OWC transmitters are differently located on the first apparatus;
receive data representative of reflected OWC signals received by at least one of the OWC receivers, each of the reflected signals corresponding to a respective one of the sequentially transmitted signals; and
process the received data to select at least one of the OWC transmitters for data transmission.

The controller may be configured to control the OWC transmitters to sequentially transmit OWC signals until a threshold value is achieved. The threshold value may comprise a value for at least one of target transmission rate, retroreflected signal power, power consumption. The controller may be configured to commence a data transmission using a selected one of more of the OWC transmitters once the threshold value has been achieved.

In a further aspect, which may be provided independently, there is provided an apparatus comprising:
a plurality of OWC transmitters spatially distributed on the apparatus; and
a controller configured to selectively activate the plurality of OWC transmitters to provide a first mode of operation and/or a second mode of operation;
the first mode of operation comprising a spatial multiplexing mode in which different signals are sent substantially simultaneously using different ones of the OWC transmitters;
the second mode of operation comprising a diversity gain mode in which the same signal is sent using multiple ones of the OWC transmitters.

The first mode of operation and the second mode of operation may be provided substantially simultaneously. The first mode of operation and the second mode of operation may be provided by different OWC transmitters of the plurality of OWC transmitters.

In a further aspect, there is provided an optical wireless communication (OWC) system comprising:
a first apparatus comprising a plurality of OWC transmitters and a plurality of OWC receivers;
a second apparatus comprising at least one reflector; and a reflector apparatus; wherein
the first apparatus is configured to transmit signals to the second apparatus via a first, direct transmission path; and
the first apparatus is further configured to transmit signals to the second apparatus via a second, indirect transmission path in which the signal is reflected by the reflector apparatus to the second apparatus.

The second apparatus may comprise at least one receiver configured to receive signals transmitted via the first transmission path and signals transmitted via the second transmission path. The second apparatus may comprise a combiner configured to combine signals transmitted via the first transmission path and signals transmitted via the second transmission path. The transmission via the first and second transmission paths may provide angular diversity.

In a further aspect, which may be provided independently, there is provided a system comprising:
a first apparatus comprising a plurality of OWC transmitters and a plurality of OWC receivers;
a second apparatus comprising at least one reflector, at least one OWC receiver and a combiner; and
a controller configured to control the OWC transmitters of the first apparatus;
wherein the controller is configured to activate a first at least one of the OWC transmitters of the first apparatus to transmit OWC signals in a first direction and to activate a second, differently located at least one of the OWC transmitters of the first apparatus to transmit OWC signals in a second, different direction; and
the at least one OWC receiver of the second apparatus is configured to receive OWC signals transmitted by the first at least one OWC transmitter of the first apparatus and the second at least one OWC transmitter of the first apparatus; and
the combiner is configured to combine the received OWC signals transmitted by the first at least one OWC transmitter of the first apparatus and the second at least one OWC transmitter of the first apparatus.

In a further aspect, which may be provided independently, there is provided a system comprising:
an access point comprising a plurality of OWC transmitters and a plurality of OWC receivers; and
a first station and a second station, each of the first station and second station comprising a respective at least one reflector and at least one OWC receiver; and
a controller configured to control the OWC transmitters of the access point;
wherein the controller is configured to process data representative of at least one OWC signal that is received by at least one of the OWC receivers of access point after having been transmitted by at least one of the OWC transmitters of the access point and reflected by the at least one reflector of the first station, and to process data representative of at least one OWC signal that is received by at least one of the OWC receivers of the access point after having been transmitted by at least one of the OWC transmitters of the access point and reflected by the at least one reflector of the second station;
the controller is configured, based on the processing to activate a first at least one of the OWC transmitters of the access point for transmission to the first station and to activate a second, different at least one of the OWC transmitters of the access point for transmission to the second station.

In a further aspect, which may be provided independently, there is provided a system comprising:
a first apparatus comprising a plurality of OWC transmitters and a plurality of OWC receivers; and
a second apparatus and a third apparatus, each of the second apparatus and third apparatus comprising a respective at least one reflector and at least one OWC receiver; and
a controller configured to control the OWC transmitters and OWC receivers of the first apparatus;
wherein the controller is configured to process data representative of at least one OWC signal that is received by at least one of the OWC receivers of the first apparatus after having been transmitted by at least one of the OWC transmitters and reflected by the at least one reflector of the second apparatus, and to process data representative of at least one OWC signal that is received by at least one of the OWC receivers of the first apparatus after having been transmitted by at least one of the OWC transmitters of the first apparatus and reflected by the at least one reflector of the third apparatus; and
the controller is configured, based on the processing to identify the second apparatus and the third apparatus based on the received reflected signals.

The controller may be configured to identify a user of the second apparatus and to identify a user of the third apparatus based on the received reflected OWC signals. The controller may be configured to distinguish between the user of the second apparatus and the user of the third apparatus. The identifying may comprise using encoded identity information. The identifying may be performed using power matrix interrogation.

The controller may be configured, based on the processing, to activate a first at least one of the OWC transmitters of the first apparatus for transmission to the second apparatus and to activate a second, different at least one of the OWC transmitters of the first apparatus for transmission to the third apparatus. The controller may be configured to transmit different OWC signals to the second apparatus than to the third apparatus based on the received reflected OWC signals. The controller may be configured to transmit different OWC signals to the second apparatus than to the third apparatus based on the encoded information and/or based on power matrix interrogation. The controller may be configured to perform a handover based on the encoded information and/or based on power matrix interrogation.

Each OWC signal is sent using modulated light. The modulated light may be modulated at a modulation rate of at least 1 kHz, optionally at least 100 kHz, further optionally at least 1 MHz. The modulated light may be modulated at a modulation rate of less than 1 PHz, further optionally less than 1 THz, further optionally less than 100 GHz, further optionally less than 10 GHz.

The modulated light may be modulated with a modulation scheme comprising at least one of on-off keying (OOK), phase shift keying (PSK), M-ary pulse amplitude modulation (M-PAM), M-ary quadrature amplitude modulation (M-QAM) or orthogonal frequency division multiplexing (OFDM), Discrete Hartley transformation, Wavelet packet division multiplexing (WPDM), Hadamard coded modulation (HCM), pulse-position modulation (PPM), Colour shift keying (CSK), carrier-less amplitude and phase (CAP), discrete multi-tone (DMT). The modulation may be coherent or incoherent.

There may be provided an apparatus comprising a controller as claimed or described herein. There may be provided a system comprising and apparatus as claimed or described herein. There may be provided a system comprising any combination of apparatuses as claimed or described herein.

There may also be provided an apparatus or method substantially as described herein with reference to the accompanying drawings.

Features in one aspect may be applied as features in any other aspect, in any appropriate combination. For example, device features may be provided as method features or vice versa.

BRIEF DESCRIPTION OF THE DRAWINGS

Embodiments of the invention are now described, by way of non-limiting examples, and are illustrated in the following figures, in which.

DETAILED DESCRIPTION

The term light herein may be used, for example, to refer to electromagnetic waves with wavelengths in a range 1 nm to 2500 nm, which includes ultraviolet, visible light and near-infrared wavelengths.

Figure 1A:
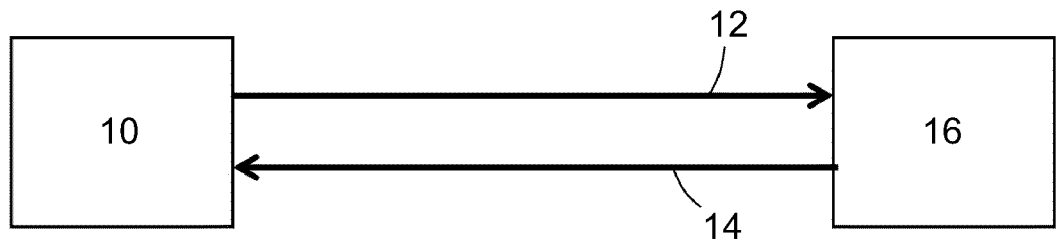
FIG. 1A is a schematic diagram of an optical wireless communication system.

FIG. 1A is a schematic block diagram illustrating an optical wireless communication (OWC) link. A first OWC apparatus 10 is configured to send a wireless optical signal in which information is encoded. The first OWC apparatus 10 is configured to send the wireless optical signal through a first optical communication channel 12 to a second OWC apparatus 16. The first optical communication channel 12 may be a free-space communication channel. Free space communication channels include transmission of optical signals through air, space, vacuum, liquid such as water or similar. The first optical communication channel has a first characteristic optical wavelength.

The second OWC apparatus 16 is configured to send a further wireless optical signal in which information is encoded. The second OWC apparatus 16 is configured to send the further wireless optical signal through a second optical communication channel 14 to the first OWC apparatus 10. The second optical communication channel 14 may be a free-space communication channel. The second optical communication channel has a second characteristic optical wavelength, which is different from the first characteristic optical wavelength.

The first OWC apparatus 10 may be an access point (AP) which comprises a transmitter and a receiver. An AP may provide access to a local network. An access point may provide data transmission to and/or from a wired network or a Wi-Fi™ or other wireless network and/or other optical wireless communications network, optionally a LiFi network.

The second OWC apparatus 16 may be a station (STA) which comprises a transmitter and a receiver. A station may be portable or fixed. Without limitation, examples of stations include personal computers, laptops, desktops and smart devices, including mobile devices (for example, mobile phones, tablets or digital book readers). Portable stations may be powered by their own battery resource.

The apparatuses 10, 16 may support a bi-directional communication protocol. The apparatuses 10, 16 may support any suitable communication protocol, for example IEEE 802.15.7, 802.15.13, 802.11 or extensions or developments thereof; ITU-T G.9960 or extensions or developments thereof; or ITU-T G.vlc or extensions or developments thereof.

Each of the optical communication channels 12, 14 may comprise a respective LiFi communication channel. A LiFi communication channel may have various desirable characteristics. For example, it may have a range of up to 20 m or more, It has high bandwidth in comparison with for example RF or IrDA (Infrared Data Association) protocols. Full duplex is possible by using two frequencies or frequency ranges allowing high throughput speeds, e.g. halving time or doubling bandwidth of communication. Reception bandwidth is independent of transmission bandwidth, and therefore there may potentially be twice the bandwidth available for the communication exchange. It may be difficult to fake due to complexity of protocol and data stream format. It is possible to spectrum hop, for example.

In some embodiments, the first OWC apparatus 10 may comprise or form part of a Access Point (AP) device or a luminaire, which may be part of a lighting system. The second OWC station (STA) apparatus 16 may form part of a user device. The first optical communication channel 12 may be a downlink channel that is used to send information from the AP to the STA. The second optical communication channel 14 may be an uplink channel that is used to send information from the STA to the AP. In other embodiments the OWC apparatuses 10, 16 may each comprise or form part of any suitable device, for example any device configured to transmit and/or receive OWC data.

Figure 1B:
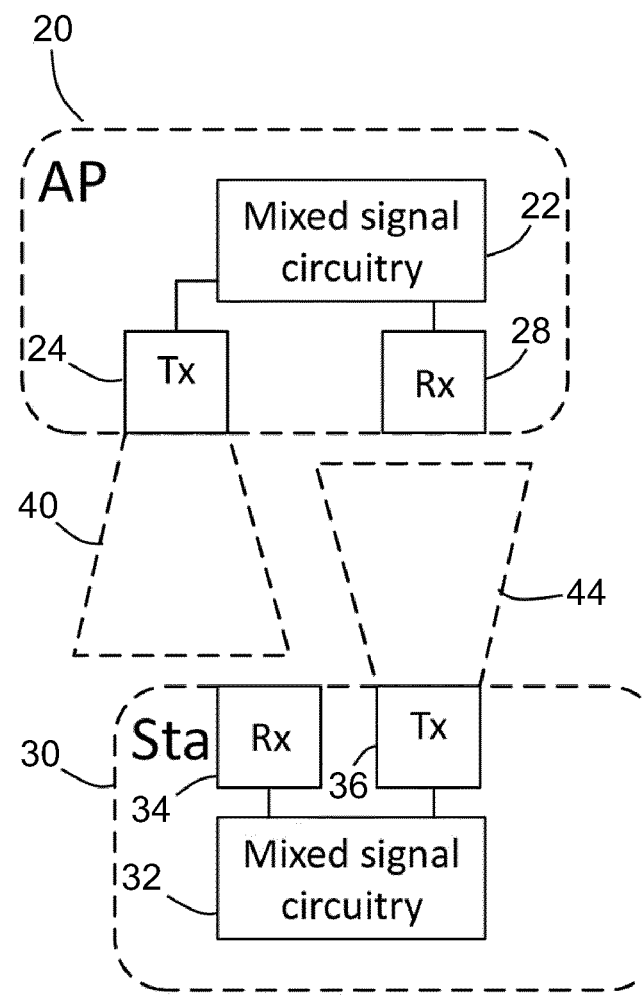
FIG. 1B is a schematic diagram of a wireless communication system.

FIG. 1B is a schematic diagram of an OWC link in accordance with an embodiment. The OWC link comprises an access point (AP) 20 and a station (STA) 30 which are configured for full-duplex communication with each other.

The AP 20 comprises mixed signal circuitry 22, an AP transmitter 24, and an AP receiver 28.

The mixed signal circuitry 22 is configured to receive data from a network (not shown) to which the AP 20 is connected, and to output a modulation signal that comprises or is representative of the data. In other embodiments, the AP 20 is not networked. The data may be obtained from any suitable data source or data store.

The mixed signal circuitry 22 includes, amongst other components, baseband circuitry, a digital to analogue converter, an analogue to digital converter, an amplification chain, at least one analogue filter, at least one power supply and at least one driver (all not shown). In other embodiments, some of the components listed above may be omitted from the mixed signal circuitry 22 and/or further components not listed such as a processor may be present.

The AP transmitter 24 comprises a light source (not shown), which is configured to emit modulated light having a first characteristic wavelength. The AP transmitter 24 further comprises circuitry (not shown) which is configured to drive the first light source to emit light having an intensity that is modulated in accordance with the modulation signal. The light source may comprise any suitable light source, for example an LED, a laser, for example a VCSEL (vertical-cavity surface-emitting laser) or a laser diode, or an LEP (light-emitting plasma). The light source may comprise a plurality of light sources, for example an array of light sources.

The AP receiver 28 comprises at least one photodetector (not shown) which is configured to detect modulated light having a second characteristic wavelength. Any suitable photodetector or photodetectors may be used. For example, the AP receiver 28 may comprise at least one Si PIN photodiode, silicon photomultiplier (SiPM), single photon avalanche diode (SPAD), Graphene-CMOS high-resolution sensor or avalanche photodiode (APD).

The AP receiver 28 further comprises receiver circuitry that is configured to obtain a signal from the photodetector that is representative of the light received by the photodetector, and to process the signal from the photodetector to provide a receiver signal to the mixed signal circuitry 22.

The mixed signal circuitry 22 is further configured to receive the receiver signal from the AP receiver 28 and demodulate the receiver signal to obtain data. The mixed signal circuitry 22 is further configured to send the data to the network (not shown) to which the AP 20 is connected.

The STA 30 comprises mixed signal circuitry 32, a STA receiver 34, and a STA transmitter 36.

The mixed signal circuitry 32 comprises baseband circuitry, a digital to analogue converter, an analogue to digital converter, an amplification chain, at least one analogue filter, at least one power supply and at least one driver (all not shown). In other embodiments, some of the components listed above may be omitted from the mixed signal circuitry 32 and/or further components not listed may be present such as for example a processor. The mixed signal circuitry 32 is configured to provide both full-duplex communication and half-duplex communication.

The STA receiver 34 comprises a photodetector (not shown) that is sensitive to light Photodetectors that are sensitive to a broad spectrum of light are known. For example, a photodetector may be sensitive to ultraviolet, visible and infrared wavelengths. In one embodiment, the STA receiver 34 comprises at least one APD (avalanche photodiode). In other embodiments, the STA receiver 34 comprises at least one Si PIN photodiode. In further embodiments, the STA receiver 34 may comprise any photodetector that is capable of receiving light of suitable frequencies. For example, the STA receiver 34 may comprise at least one Graphene-CMOS high-resolution sensor. In further embodiments, the STA receiver 34 may comprise at least one silicon photomultiplier (SiPM) or single photon avalanche diode (SPAD) as the photodetector.

The STA receiver 34 further comprises circuitry (not shown) which is configured to receive a signal from the photodetector that is representative of modulated light received by the photodetector and to output a receiver signal to the mixed signal circuitry 32.

The mixed signal circuitry 32 is further configured to receive the receiver signal from the STA receiver 34 and demodulate the receiver signal to obtain data. The mixed signal circuitry 32 includes, amongst other components, an analogue to digital converter (not shown). The data received by the STA 30 may be used in any suitable manner, for example to provide information or a service to a user of a device in which the STA 30 is incorporated.

The mixed signal circuitry 32 is further configured to obtain digital or analogue data for uplink transmission. For example, the mixed signal circuitry 32 may obtain data from an input by a user of a device in which the STA 30 is incorporated, or from processes running in the device in which the STA 30 is incorporated. The mixed signal circuitry 32 is configured to output a modulation signal that comprises or is representative of the data. The mixed signal circuitry 32 includes, amongst other components, a digital to analogue converter (not shown).

The STA transmitter 36 is used to transmit modulated light. The STA transmitter 36 comprises a light source which is configured to emit modulated light having the second characteristic wavelength. In other embodiments, any suitable wavelength or range of wavelengths may be emitted by the STA transmitter 36. The STA transmitter 36 further comprises circuitry (not shown) which is configured to receive a modulation signal and to drive the light source of the first STA transmitter 36 to emit light having an intensity that is modulated in accordance with the modulation signal.

The light source of the STA transmitter 36 may comprise any suitable light source, for example a laser, for example a VCSEL (vertical-cavity surface-emitting laser) or a laser diode, or an LEP (light-emitting plasma). The light source of the STA transmitter 36 may comprise a plurality of light sources, for example an array of light sources.

Any suitable modulation scheme or schemes may be used for modulation of light by the AP transmitter 24 and STA transmitter 36. For example, orthogonal frequency division multiplexing (OFDM) modulation schemes are used in some embodiments, and the demodulation is from the OFDM modulation scheme. In further embodiments and without limitation, other modulation schemes may be used, for example on-off keying (OOK), phase shift keying (PSK), M-ary pulse amplitude modulation (M-PAM), M-ary quadrature amplitude modulation (M-QAM), Discrete Hartley transformation, Wavelet packet division multiplexing (WPDM), Hadamard coded modulation (HCM), pulse-position modulation (PPM), Colour shift keying (CSK), carrier-less amplitude and phase (CAP), or discrete multi-tone (DMT). The light may be modulated at a modulation rate between 1 kHz and 1 PHz, for example at a modulation rate between 1 MHz and 100 GHz.

The modulation scheme or schemes may form part of an OWC communication protocol, such that the optical signal is produced according to the OWC communication protocol. The OWC communication protocol may be packet-based.

System

A system described below aims to provide an extremely high bandwidth, low-latency wireless network with scalable coverage over a contiguous space. The system targets a performance of >20 Gbps download speeds to a single end-point with a latency of <200 µs. While it is anticipated that virtual reality devices will be early adopters of this technology due to high bandwidth and low latency requirements, end-point devices may also include smartphones, televisions and computers. An end-point communication link designed and optimized for extremely demanding VR applications will also be able to easily handle normal consumer internet access and IoT applications.

With respect to VR applications, the uplink from a user station (STA)/end-point, for example a VR head mounted display (HMD) and/or other VR accessories, will generally be used for control and feedback relating to parameters such as head orientation, body position and eye-tracking reporting. Downlink from an access point (AP) or points will generally be used for audio, video and graphics. Because of the anticipated asymmetric amount of data transmitted to and from a STA, the uplink data rate may be lower than the downlink data rate. While the downlink uses higher bandwidth, the system may be designed to degrade gracefully when downlink data packets are missing. Downlink and uplink channels may benefit from different channel coding including different levels of protection for bits/packets. Because the characteristic of the channels for optimized uplink and downlink performance may be different, the system should generally be full duplex, able to receive and transmit data asynchronously and simultaneously.

When table, shelf, wall or ceiling mounted, a primary AP shall provide good connectivity to stations within its field of view (for example, −0 degrees +60 degrees in the vertical plane +/−40 degrees in the horizontal plane). The field of view for end-point devices varies with application but for VR HMDs a FOV of +/−90 degrees may be assumed in vertical and horizontal planes. Maximum distance from the primary access point to an HMD on axis may be greater than 4 meters, optionally 6 meters.

The entire system may need to work in a darkened room, so infra-red wavelengths may be used for all the communication channels. Typically, IR receivers also have a higher gain compared to visible light, and therefore an IR channel may have a higher SNR dependent on eye-safety restrictions. At least two IR channels are used in the preferred embodiment, but multiple wavelengths may be utilized and combined to obtain the necessary bandwidth for the end-point downlink channel, or and mesh channel is incorporated. The addition of a mesh channel may use an additional IR channel.

A preferred embodiment comprises four primary elements:

One or more Access Points (APs): an AP comprising a transceiver comprising multiple transmitters (TX) and receivers (RX) providing broad coverage of a given space, for example a residential room. Optionally, an AP may be connected to a network outside of the room, for example a wide-area network such as the Internet. Network access may be wired or wireless, RF or optical, where communication is subject to standard or bespoke network protocols.

A Secondary Transmission System (2TX): A passive reflective system provides one or more secondary transmission paths from the AP downlink as well as a transmission path for a retroreflected signal from the STA to the AP and back again. The passive reflective system may also provide one or more secondary transmission paths for a STA uplink. The secondary transmission system may create additional coverage of the space. The secondary transmission system may provide redundancy of signal. The secondary transmission system may provide information regarding relative signal strengths along reflected paths.

A Station (STA): AR/VR glasses/goggles/head mounted displays (HMDs) and/or ancillary user devices comprising one or more receivers surrounded by and/or collocated with retro-reflectors and one or more transmitters provides an uplink to the AP(s). The STA will predominantly transmit downlink and uplink data along a direct path to the AP but reflected paths may also be utilized. One or more retroreflectors on the STA reflect the downlink signal back to the AP, providing information on the performance of the different downlink paths, both direct and reflected, helping to decide which TXs and RXs at the AP should remain active.

A Monitoring and Control System: The system analyses signals received via retroreflection from the STA, providing information on the performance of downlink paths (direct and reflected) of individual or grouped TXs and RXs that make up the AR. Based on this information, the control system uses logic to dynamically manage which individual or groups of TX and RX on the AP should be active/switched on/in a higher power state.

The system may provide:
The use of feedback from retroreflectors to manage TX/RX activity in a multi-detector system;
Flexible ganging/spatial multiplexing for multiuser access and effective interference mitigation;
Flexible exploitation of reflections;
Building a reflective environment.

Figure 2:
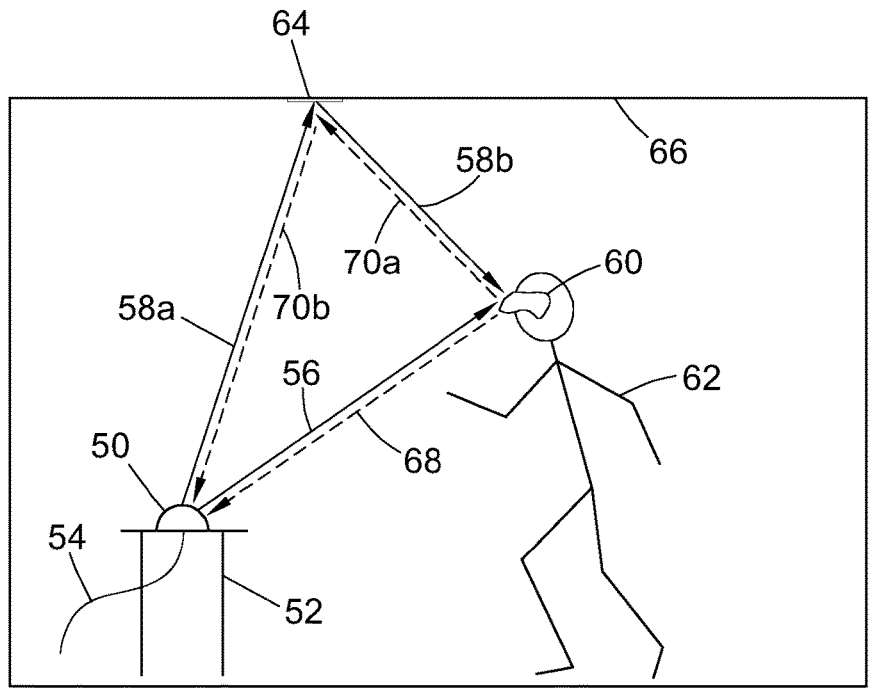
FIG. 2 is a schematic illustration showing two paths from an access point (AP) to a station (STA): a primary direct path and a secondary reflected path.

FIG. 2 is a schematic illustration of an embodiment comprising the above four elements. An AP 50 is positioned on a table 52 and is connected to a network via a network cable 54. A user 62 wears a head-mounted display 60 comprising a station. A reflector 64 is positioned on a ceiling 66, providing a secondary transmission system. In use, the AP 50 transmits modulated light to the station via two paths, which comprise a primary direct path 56 and a secondary reflected path 58*a*, 58*b*. The secondary reflected path comprises a first portion 58*a* from the AP 50 to the reflector 64, and a second portion 58*b* from the reflector 64 to the head-mounted display 60.

Part of the modulated light transmitted via the primary direct path 56 is reflected by a retroreflector (not shown) positioned on the head-mounted display 60 and returns to the AP 50 via a direct return path 68. Part of the modulated light transmitted via the reflected path 58*a*, 58*b* is reflected by a retroreflector (not shown) positioned on the head-mounted display 60 and returns to the AP 50 via a reflected return path 70*a*, 70*b*. The reflected return path 70*a*, 70*b* comprises a first portion 70*a* from the head-mounted display 60 to the reflector 64, and a second portion 70*b* from the reflector 64 to the AP 50. Reflected signals are analysed by the AP 50.

The AP 50 is configured to transmit a downlink signal using a first wavelength of light. The head-mounted display 60 is configured to receive the downlink signal. The head-mounted display 60 is configured to transmit an uplink signal using a second, different wavelength of light. In some embodiments, the AP 50 is configured to receive both the first wavelength (so as to receive light that has been transmitted from the AP 50 and then reflected by a retroreflector of the STA) and the second wavelength (so as to receive the uplink signal). In other embodiments, the reflected signal may be frequency-shifted as described below.

The elements are described in more detail on the following pages.

Access Point

In the preferred embodiment, the transmitter is a fixed optical wireless 'grid-of-beam' (GoB) access point, or access points, within a compartment space. This system may be similar to the IEEE 802.16 GoB based downlink Multi-User MIMO scheme (www.ieee802.org/16/tgm/contrib/C80216m-08_487.doc), with the feedback of the desired beam index received from retroreflection of the transmitted signal (see the section on the Station below for further information on the retroreflector). Multiple narrow high bandwidth transmitters, e.g. Lasers such as vertical-cavity surface-emitting lasers (VCSELs), may be arranged on a three-dimensional structure such as a partial- or fully-spherical base, depending on where the AP(s) is/are positioned. The VCSELs are preferably optimised for long wavelengths, for example 1550 nm for eye safety (for example, see https://www.lightwaveonline.com/articles/print/volume-28/issue-6/technology/long-wavelength-vcsel-technology-improves.html). Optionally, the VCSELs may be optimised for 850 nm wavelengths for cost reduction. Each transmitter has at least one co-located photodetector, preferably a single-photon avalanche photodiode (SPAD), or optionally an avalanche photo detector (APD) or PIN diode, to which it is paired. Conditioning optics such as lenses and filters are placed above the transmitters and receivers. A combination of a transmitter and a co-located photodetector may be referred to as a TX/RX pair.

TX/RX pairs may have a one-to-one mapping or one-to-many mapping, where, for example, one receiver is paired with a plurality of transmitters.

The RXs in the TX/RX pairs of the grid of beams may be solely for receiving the retroreflected signal to determine which TXs should remain active. In that case, a further RX for reception of the uplink signal may be located apart from, but near to the GoB system. In such embodiments, the RXs in the TX/RX pairs may therefore be low price/smaller/lower quality, for example SPADs, and configured to receive on the same channel as the downlink. If the RXs in the TX/RX pairs are also used to receive the uplink, the RXs may either be configured to receive along both the uplink and downlink channels or the modulation/demodulation circuitry may include interference correction to distinguish the uplink signal from the retroreflected downlink signal.

The TXs preferably have a field of view (FOV) of 4°, optionally 2°. The number of TX/RX pairs required may be configured to provide sufficient coverage of the space while maintaining an appropriate level of directionality of the beams. For 4° beams, the number of TXs required in a quarter-sphere would be a maximum of 369 TXs. (For a detector with an area of 1 cm$^2$, that would be a ¼ sphere AP 20 cm across and 10 cm high). For 2° beams, the number of TXs required in a quarter-sphere would be a maximum of 1736 TXs. (For TRX with an area of 1 cm$^2$, that would be a ¼ sphere AP (sqrt(1736×4/4pi)) 47 cm across and 23.5 cm high). The number of TXs may be reduced and the FOV may be increased in the direction most likely to be in direct line of sight of the user(s).

Figure 3:
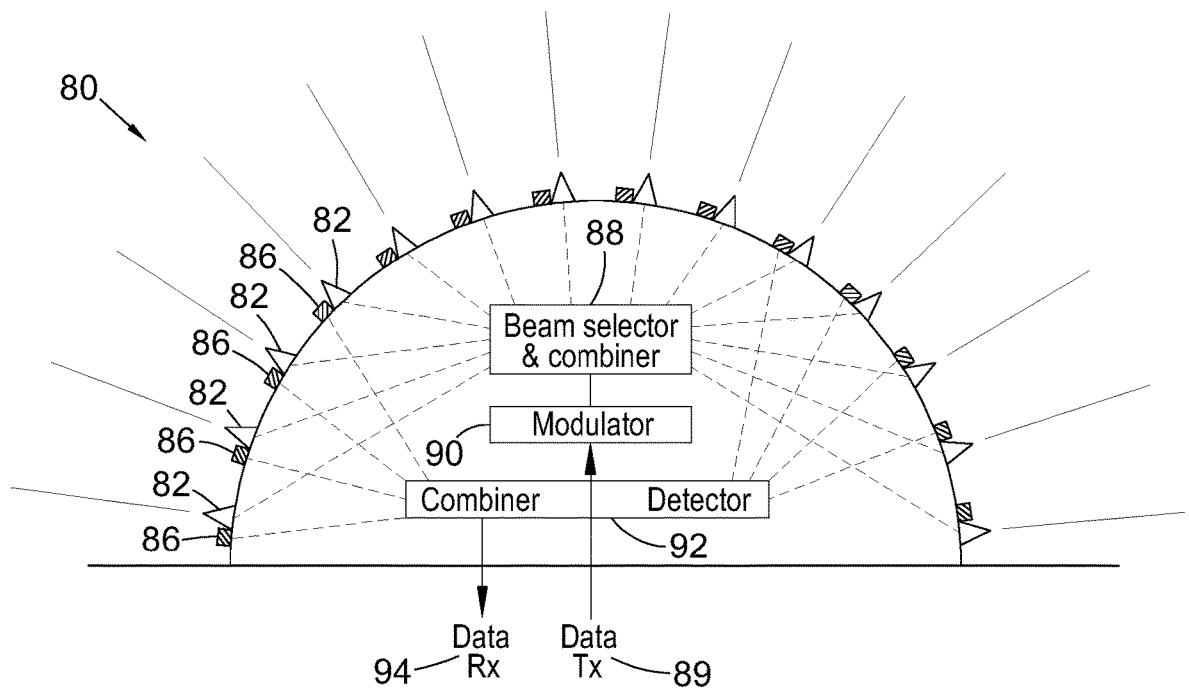
FIG. 3 is a schematic illustration of a Grid-of-beam (GoB) transmitter.

FIG. 3 is a schematic illustration of a grid-of-beams (GoB) transmitter 80. The GoB transmitter 80 comprises a plurality of individual transmitters 82 that are configured to transmit beams 84, and a corresponding plurality of photodetectors 86. The GoB transmitter 80 comprises a beam selector and combiner 88 and a modulator 90. In use, data 89 for transmission by the GoB 80 is provided to the modulator 90 which outputs a modulated signal. The modulated signal from the modulator 90 is provided to the beam selector and combiner 88, which selects one or more of the transmitters 82 to transmit the modulated signal. The modulated signal is transmitted via one of more of the beams 84, which in the present embodiment are laser beams. Eye safety of the beams may be maintained by, for example, power control and optics.

The GoB transmitter 80 further comprises a detector/combiner unit 92 which is configured to receive signals from the photodetectors 84 and to combine the received signals to obtain received data 94.

The beam selector 88 is configured to switch on and off beams individually. It can combine data streams. The co-located photodetectors 84 are connected to a detector/combiner unit 92 which can digitally combine/multiplex the signals.

The preferred embodiment is for a three-dimensional arrangement of transmitters and receivers with relative angular beam positioning and curved mounting arrangement, for example as shown in FIGS. 3, 4a, 4b and 4c. An alternative embodiment of the AP device may comprise one or more flat mounting arrangements or a combination of both flat and curved mounting arrangements to achieve relative angular beam positioning of some of the transmitters and/or receivers and/or Tx/Rx pairs. An optical lens arrangement adjacent to the transmitters and receivers of an AP device may be used to alter the relative angular beam position.

Figure 4A:
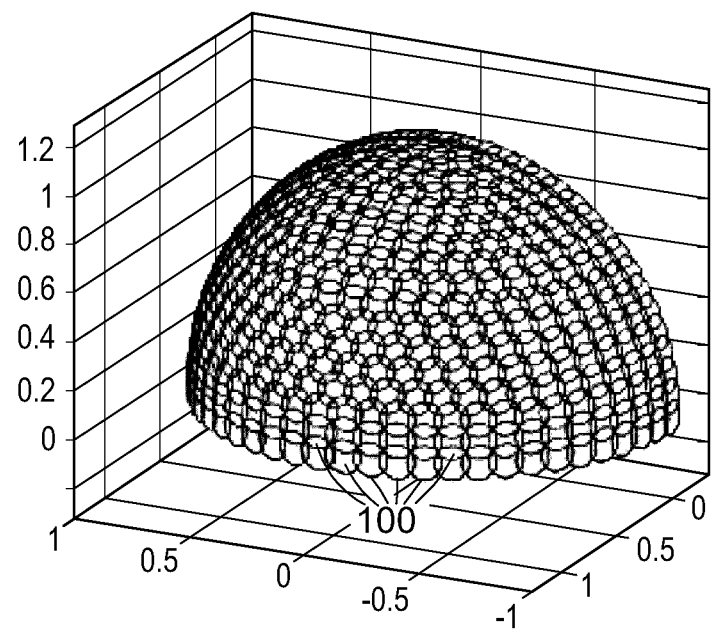
FIG. 4A is a plot of beams of a preferred embodiment of a GoB transmitter with field of view (FOV) of the transmitters at 4°.
Figure 4B:
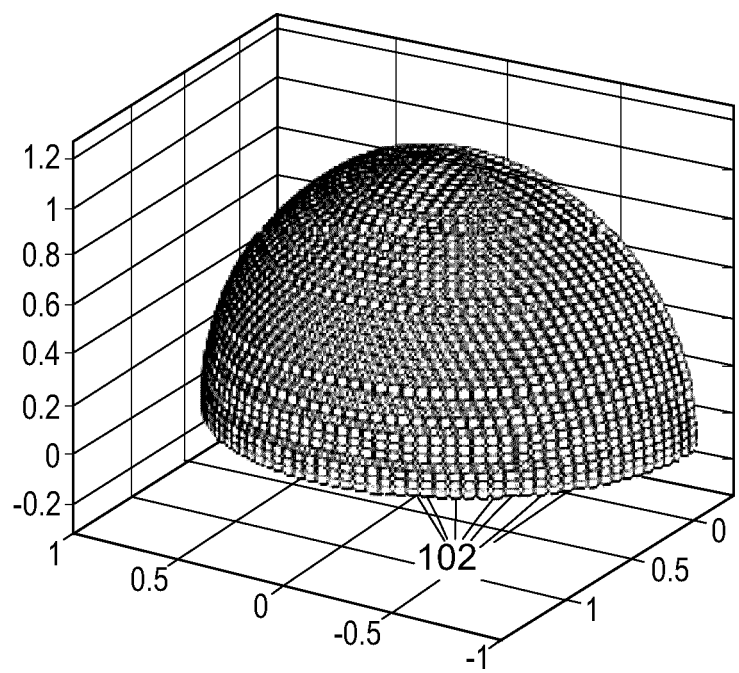
FIG. 4B is a plot of beams of a GoB transmitter, with FOV of the transmitters at 2°.

FIG. 4A is a plot illustrating a positioning of a plurality of beams 100 of a first grid of beams, in which each beam has a respective field of view of 4°. The field of view of a given beam may be an angle of coverage provided by that beam. The beams are distributed across a quarter-sphere. FIG. 4B is a plot illustrating a positioning of a plurality of beams 102 of a second grid of beams, in which each beam has a respective field of view of 2°. The beams are distributed across a quarter-sphere.

Optionally, the transmitters and receivers in the AP array may have different FoV/size/sensitivity/data rate/construction dependent on, for example the location on the AP. For example, the central TX/RX pairs most likely to participate in a direct LoS link with the STA may be larger or may have larger FoVs to increase performance or redundancy/overlap in the region where the user will most likely be positioned.

Figure 4C:
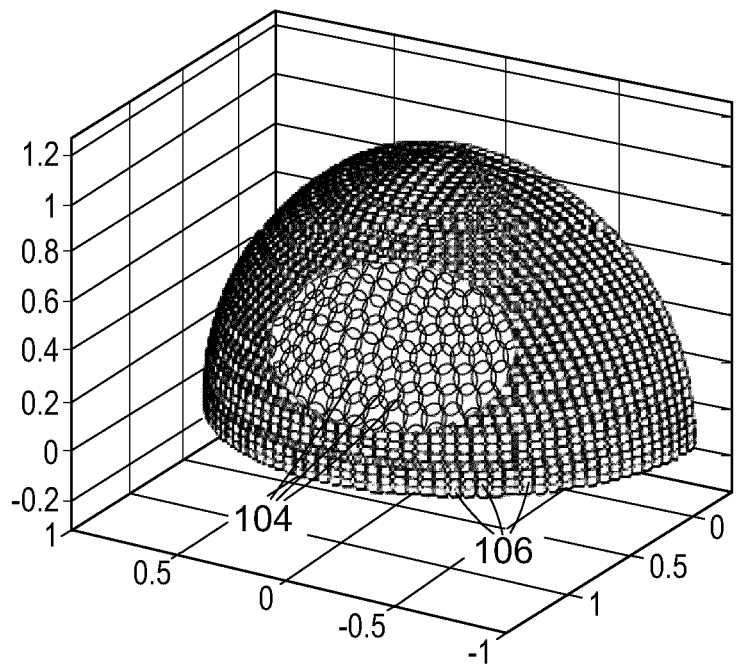
FIG. 4C is a plot of beams of a GoB transmitter including two regions that differ in FoV.

FIG. 4C illustrates an optional feature in which a grid of beams includes at least two regions that differ in field of view. First beams 104 have a first field of view. Second beams 106 have a second, smaller field of view. The transmitters in the two regions may differ in FoV, performance, construction, size of the TX and/or RX within said region.

Figure 5:
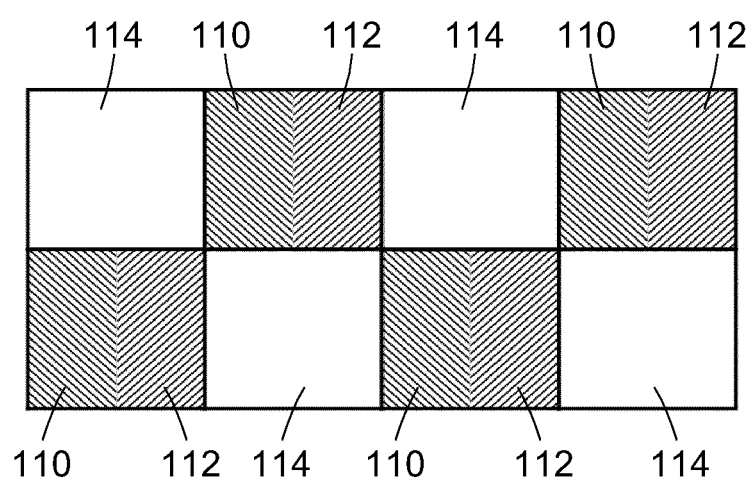
FIG. 5 is a schematic illustration of a repeating pattern of transmitters and receivers.

On the AP, TX/RX pairs are preferably positioned in a repeating pattern. FIG. 5 is a schematic illustration of a repeating pattern of transmitters and receivers. Receivers 84 are optionally capable of receiving two separate wavelengths of light over two separate regions 110, 112, represented by the two directions of shading in FIG. 5 (transmitters 82 are represented by the blank squares 114).

Receivers 84 of the grid of beams are configured to receive at least a retroreflected signal that is received when a downlink signal from the AP is reflected from the station (for example, the head-mounted display 60). In some embodiments, the receivers 84 also receive uplink signals from the station.

TX and RX, at least the RX configured to receive the retroreflected signal $RX_{-RR}$, are collocated at the AP in order that the retroreflected signal from a given TX will be received by its $RX_{-RR}$ pair. In the preferred embodiment, the RXs at the AP are capable of receiving retroreflected signals at the downlink wavelength. This is for the case where the retroreflected signal is not converted by the retroreflector to the wavelength of the uplink. The system may take advantage of two separate receivers for the uplink and retroreflected signal, or one receiver could be capable of receiving two wavelengths of signal, for example by using a filter that allows two wavelengths through while blocking other wavelengths, for example a band-stop/band-rejection/notch filter or wide band filter. In the case where the wavelength is converted to that of the uplink, the receivers would be optimised to receive both uplink and retroreflected signals at the same wavelength. This embodiment would require deconvolution of the interference between the uplink and retroreflected signals using analogue or digital filters and/or successive interference cancellation techniques, for example as described in R. S. Mowbray, R. D. Pringle and P. M. Grant, "Increased CDMA system capacity through adaptive cochannel interference regeneration and cancellation," in IEE Proceedings I—Communications, Speech and Vision, vol. 139, no. 5, pp. 515-524, October 1992 doi: 10.1049/ip-i-2.1992.0069.

In other embodiments, there may be two transmitters at each TX site on the AP, one for the downlink data TX AP signal and one for the retroreflected signal. The transmitter for the retroreflected signal, TX_RRS, would use the same channel as the uplink from the STA, and therefore the receivers at the AP, RX_AP, would be able to read it. Once a connection is made, and the system starts receiving an uplink signal from the STA, the TX_RRS may stop transmitting. This may reduce or eliminate interference between the retroreflected signal and the STA uplink signal.

Alternatively, the receiver $RX_{\_AP}$ for receipt of the uplink signal from the STA may be positioned outside of the GoB $TX/RX_{\_RR}$ paired array, or substantially at one primary location, for example centrally with respect to the GoB $TX/RX_{\_RR}$ paired array. The RX_AP may have a substantially wider FoV, higher efficiency/sensitivity or different construction to that of the individual $RX_{\_RR}$s.

In some embodiments at least one of the uplink receivers $RX_{\_AP}$ may be active while the AP is in initiation, standby or sleep mode. An uplink or power/RSSI signal received on the at least one active $RX_{\_AP}$ while the AP is in any of these modes may be processed and logic applied to initiate transmission from at least one of the AP transmitters most likely to participate in a direct line of sight link with the device producing the input signal to the uplink receiver(s) $RX_{\_AP}$.

A single primary access point may provide a good VR experience for multiple HMDs, however, applications may require better area or room coverage and some redundancy to mitigate shadowing. For these reasons secondary access points may be added. In the preferred embodiment, secondary access points may utilize lighting sockets, for example, in the ceiling, for power. Even in embodiments in which visible light is not used for communications, lighting sockets may be useful because they will typically be the best positioned power sources in the room to avoid shadowing, and they may allow for easy consumer installation.

Optional secondary access points may be peer nodes in a mesh. They may share the same optical channel for receive and transmit between nodes. All nodes may be made aware of the others and may be synchronized to avoid interference. Secondary access points may have a hemispherical field of view for both end-point devices and peer access point communication.

In the preferred embodiment, the end-point devices may not participate in the optional mesh network and may communicate only with the AP(s), primary and/or secondary APs, which provide the best signal.

Figure 7:
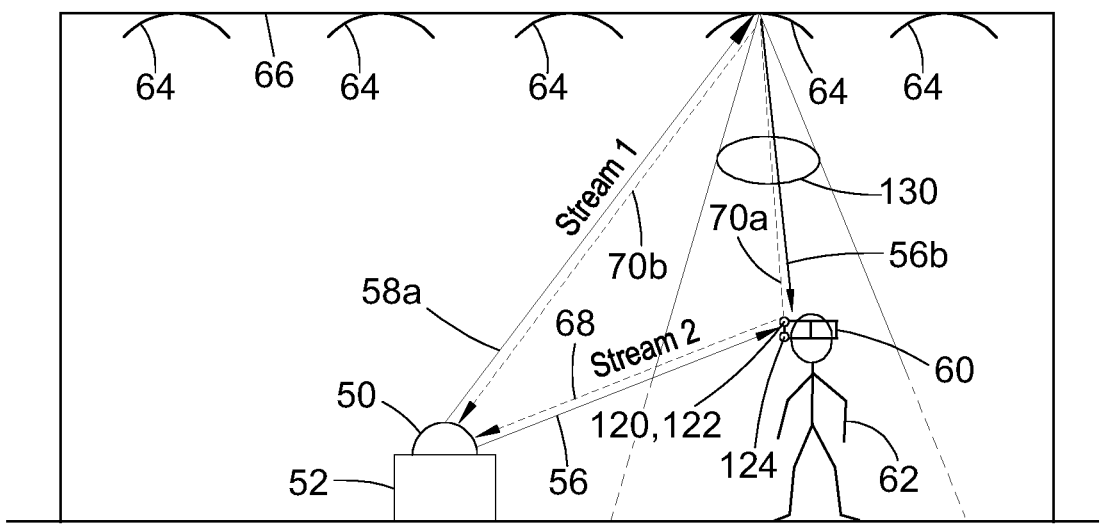
FIG. 7 is a schematic illustration of a transmission system in accordance with an embodiment.

FIG. 7 illustrates a transmission system. An AP 50 is positioned on a table 52. A plurality of reflectors 64 are positioned on a ceiling 66. A user 62 wears a head-mounted display 60. Each of the reflectors 64 may be considered to provide a respective attocell 130.

In use, the AP 50 transmits data to the head-mounted display 60 via a direct path 56 (denoted as Stream 2 in FIG. 7) and a reflected path 58a, 58b (denoted as Stream 1 in FIG. 7). Data is received by a receiver 120 positioned on the head-mounted display.

Light is reflected from one or more retroreflectors 122 of the head-mounted display 60. The AP 50 receives reflected light from the head-mounted display 60 via a direct path 68 and a reflected path 70a, 70b. The reflected beam is used to determine the active beam. The head-mounted display 60 also transmits data to the AP 50 using a transmitter 124.

Beams may reach the STA/mobile terminal in two ways:
via a direct path, and/or
via reflected path (attocell coverage).

This creates diversity which is used to enhance link robustness and to apply multiple-input-multiple-output (MIMO) transmission. Each stream carries independent data (e.g. Stream 1 in FIG. 7 may carry 5 Gbps, while Stream 2 in FIG. 7 may carry 15 Gbps because of the better signal to noise ratio (SNR), leading to a total data rate of 20 Gbps. Optionally, the split can be any data rate, for example, optionally 10 Gbps/40 Gbps split or higher).

Secondary Transmission System

A passive reflector system on the ceiling 66 and/or walls widens the beam to create many cells. This means an incoming beam is reflected into exactly the same direction as the incoming beam. This informs the transmitter which beam to be activated.

The preferred embodiment uses IR-reflective paint, for example titanium dioxide white pigmented composite (see, for example, Hyde D M et al "Investigation of Infrared Reflective Pigmentation Technologies for Coatings and Composite Applications" Proceedings, American Composites Manufacturers Association composites and polycon 2006 p 37) or 'cool' pigments of other colours that allow for visible light absorption while maintaining significant IR reflectivity (see, for example Coser E et al "Development of paints with infrared radiation reflective properties", Polimeros 25(3), 305-310 2015; Malshe F et al. "Infrared reflective inorganic pigments" Recent patents on Chemical Engineering J(1), 67-79). The paint surfaces would be preferably smooth, increasing the specular nature of the reflection, in order to maintain directionality of beams. Reflectance of non-white pigments are known to achieve up to 60% reflectivity of IR wavelengths, while white paints are known to achieve almost 90% reflectivity.

An alternative embodiment would be the positioning of passive reflectors 64 on the ceiling 66 and/or walls. The incoming beams would be reflected and widened to form attocells. The reflectors 64 would be placed in a way to ensure full coverage/tessellation. This alternative embodiment may comprise passive reflectors 64 that are clear, flat adhesive 'mirrors' positioned in order to provide coverage to a space. The passive reflectors may be positioned during a set-up stage where visible indicators such as lasers operating in the visible spectrum are used for positioning to optimise coverage in the area where the user is most likely to be located.

Station

Figure 6A:
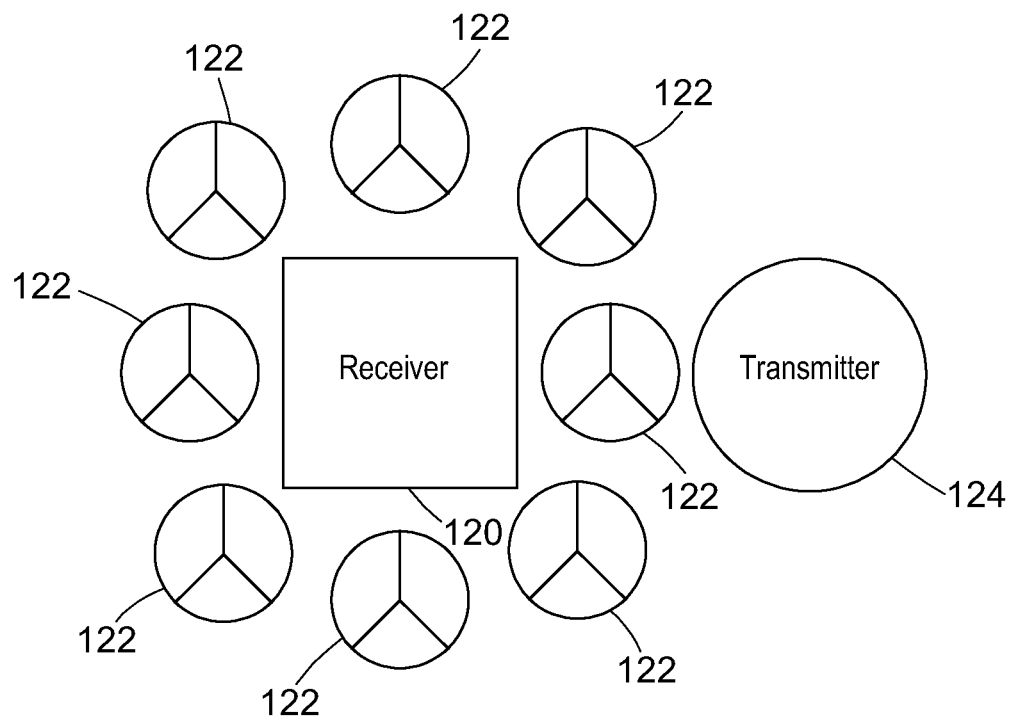
FIG. 6A is a schematic illustration of a station (STA) transceiver comprising a transmitter, receiver and a number of collocated retroreflectors, in this case 8 circular solid corner cube retroreflectors.
Figure 6B:
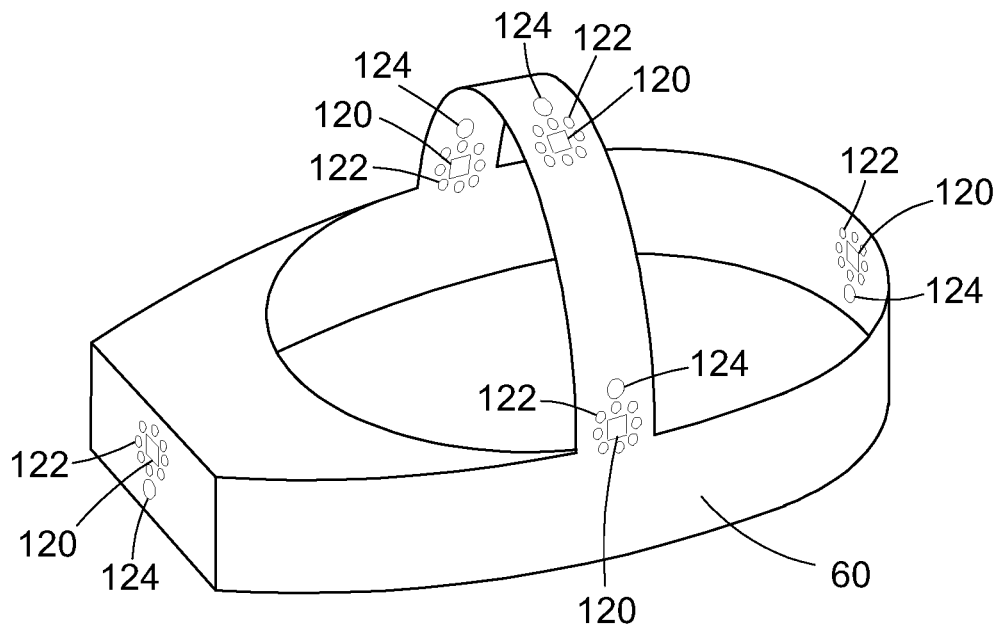
FIG. 6B is a schematic illustration of a head-mounted display in accordance with an embodiment.

FIG. 6A is a schematic illustration of a station (STA). The STA, for example an HMD, comprises one or more receivers 120 for the downlink collocated with or surrounded by one or more retro-reflectors 122 and one or more transmitters 124 to provide an uplink to the AP. In the embodiment of FIG. 6A, the retro-reflectors 122 are 8 circular solid corner cube retroreflectors. The STA will transmit data along a direct line of sight (LoS) to the AP and may also transmit data via a reflected path or paths.

This means an incoming beam is reflected in exactly the same direction as the incoming rays. The reflected beam is received by the receiver elements in the access point. The generated channel reciprocity is used to determine the active beam.

Receiver

The receiver (RX) 120 of the station may be any suitable light receiving device or photodetector. The preferred embodiment for the RX_STA is a photodetector similar to those making up the AP, e.g. an APD or SPAD. The receiver 120 may further comprise conditioning, amplification and demodulation circuitry. Multiple transceivers may be positioned about a STA, for example an HMD, so when the STA is rotated in use, the OWC communication link can be picked up by one or more other transceivers to reduce maintain the uplink, downlink and retroreflected signal.

FIG. 6A shows a head-mounted display 60 having multiple transceivers, each comprising a receiver 120, a plurality of retro-reflectors 122, and a transmitter 124.

Retroreflector

One or more retroreflectors 122 are collocated and/or surround the $RX_{\_STA}$ 120. Any suitable retroreflector can be used. In the preferred embodiment, a solid corner cube retroreflector is preferably used. The retroreflector used by Shao et al (Shao S et al. "RETRO: Retroreflector Based Visible Light Indoor Localization for Real-time Tracking of IoT Devices" IEEE INFOCOM 2018—IEEE Conference on Computer Communications, April 2018 DOI 10.1109/INFOCOM.2018.8485817) may be used. It is a circular retroreflector PS976 (uncoated) manufactured by Thorlabs. The substrate material is BK7 grade A, with a refractive index n=1.51 for visible light wavelength. The length of the retroreflector is L=35.7 mm, the length of recession is $L_s$=6.3 mm and the diameter of the front face of the retroreflector is r=50 mm. In a passive Visible Light Localisation system, it is demonstrated to provide centimetre-level location accuracy and single-digit angular error. Other forms of retroreflector may be used, for example retroreflective tape, notched angle, hollow corner cube, cat's eye, solid corner cube, ball mounted hollow retroreflectors or combination thereof may be used.

The substrate material within the retroreflector may optionally contain a wavelength converting material. For example, a material such as silicon germanium can be used to covert mid-infrared signals to near-infrared signals. This may reduce the complexity at the AP, if the retroreflected signal is returned at the same wavelength as the uplink channel. Using the same wavelength for the retroreflected signal and the uplink channel would enable the transceiver to receive both the retroreflected signal and the uplink along the same channel. As mentioned previously, having the uplink and retroreflected signal on the same wavelength would require deconvolution of the two signals at the AP.

The retroreflector may optionally incorporate a liquid crystal display (LCD) shutter and drive circuitry to modulate the retroreflected signal and encode an identifier for the Station.

The retroreflector may optionally comprise a modulator to become an MRR in order to encode and transmit high speed data on the retroreflected channel to either augment or replace the uplink.

Transmitter

The transmitter at the STA, $TX_{\_STA}$ provides uplink communication with the AP, primarily via LoS communication. The channel used may be at an IR wavelength different from that of the downlink channel. This would provide full duplex capability. The preferred embodiment of the transmitting device is a light emitter similar to that in the AP, e.g. a laser, specifically a VCSEL, but other light emitting devices may be used. The transmitter may further comprise conditioning, amplification and modulation circuitry.

While a system of transceivers on an HMD is described in the preferred embodiment, other user devices such as handheld controllers (including accessories such as simulated weapons), hand and finger movement trackers, ear phones (or other audio devices), vests, sporting simulators (including stationary bicycles), chairs, platforms (including virtualizers), VR adapters, gaming mats, etc. may be in communication with the AP. This communication may be wired or wireless, in direct communication with the AP or indirect via the HMD or other device. Wireless communication may be optical or RF. If OWC, the communication may be along the same or different channel as the downlink and uplink or using the same or different communication protocol.

The STA may also be a device other than an HMD such as a mobile phone, tablet, TV, personal computer or IoT device.

Monitoring and Control System

The AP monitoring and control system serves several purposes:
1. Identifying which TXs at the AP should be active at any given time, mitigates co-channel interference and also distinguishes between users;
2. Identifying which signals are being received along a direct line of sight (LoS) and which are being retroreflected along a non-line of sight path (nLoS);
3. Identifying which signals are coming from which users, initiating transmission after power on/recovery from sleep/standby modes;
4. Multiplexes the signals as required.

Beam switching may allow energy savings. All the beams that end up nowhere at a given time instance are switched off. If multiple beams produce useful signals at the receiver (s), the signals can be spatially multiplexed which enhances data rate. The scaling is linear with links. If the beams overlap, this could also be used to enhance diversity, and power.

The monitoring and control system may also be referred to as a controller. The monitoring and control system may be provided by the beam selector and combiner 88, or by any suitable component or components.

Identifying Active TXs

In order to identify which transmitters should remain active through transmission, the AP transmitters are cycled through and power, or received signal strength indication (RSSI), is measured at the collocated receivers on the AP. The received power at a given receiver, $RX_\beta$ from a given transmitter, $TX_\alpha$ can be denoted by $p_{\alpha,\beta}$. Hence, for a transmitted beam $\alpha$, the received power vector across N receivers will be $p_\alpha = [p_{\alpha,1}\ p_{\alpha,2}\ \cdots\ p_{\alpha,\beta}\ \cdots\ p_{\alpha,N}]$, making the received power for all the beams for Line of Sight.

$$P_{LoS} = \begin{Bmatrix} p_1 \\ p_2 \\ \vdots \\ p_N \end{Bmatrix} = \begin{Bmatrix} p_{1,1} & p_{1,2} & \cdots & p_{1,N} \\ p_{2,1} & p_{2,2} & \cdots & p_{2,N} \\ \vdots & \vdots & \ddots & \vdots \\ p_{N,1} & p_{N,2} & \cdots & p_{N,N} \end{Bmatrix}$$

Therefore, the vector for selection of active transmitters can be expressed as:

$$s_{LoS} = [\, p_{1,1} \quad p_{2,2} \quad \cdots \quad p_{\alpha,\alpha} \quad \cdots \quad p_{N,N} \,]$$

And the beams used for the direct link will be selected based on the largest value(s) in the array:

$$\text{argmax}(p_{\alpha,\alpha}), \alpha \in [1, N]$$

Similarly, for the reflected or non-line-of-sight (NLoS) link, the vector used for the transmitting beam selection $s_{NLoS}$ may be determined.

The transmitters may be cycled through starting from the region most likely to be in direct line of sight of the STA TRX, for example the centre TX/RX pairs of the AP and spiralling radially outward. At TX surrounding $RX_\beta$ where the power is above a certain threshold, the TX adjacent to said $RX_\beta$ will be kept on. If the power for a given TX being active is not achieved, it will be switched off. When the data rate exceeds a certain value (for example, a preferred threshold), the system may start transmitting data. The remaining TXs may be cycled through to identify further TXs whose retroreflected power is also above a given threshold. All TXs above a threshold power/RSSI and their immediate neighbouring TXs may remain active while OWC data transfer is ongoing.

As the user moves, the power will change, and the maximum power received in both the downlink and/or retroreflected signals will continue to change from RX to RX. As the power vector changes in the currently activated TXs, currently disabled TXs can be activated and currently active TXs can be deactivated to continue to centre the activation area around the TX most likely to be in the most direct communication with the STA. Thus, the user can be intelligently tracked while in motion, ensuring a sufficient data rate is maintained.

In the case of the reflected signal which may not provide a retroreflected signal with a strong enough SNR or RSSI to be detectable, the uplink signal may be used to determine RSSI, augmenting the activation pattern established when transmitters that have been cycled through to determine the TX that should be active by measuring the retroreflected direct LoS signal.

Multiplexing

Multiplexing can be based on detection of transmitted direct and/or reflected signals as well as the spatial positioning of the detectors. For example, transmitters immediately adjacent to or within a specific physical distance of receivers that detect a direct or reflected signal may be combined.

Multi-User Case

In the case where there is more than one user trying to establish a communication link with an AP, the effect of co-channel interference should be considered. Instead of selecting transmitting beams based on the power/RSSI vector as in the single user case above, a power matrix may be considered. For a given user p, power vectors for LoS and NLoS may be represented by vectors $s_{LoS,\mu}$ and $s_{NLoS,\mu}$ respectively. Therefore, the power matrix may be represented by:

$$s = [\, s_{LoS,1} \quad s_{NLoS,1} \quad \cdots \quad s_{LoS,\mu} \quad s_{NLoS,\mu} \quad \cdots \quad s_{LoS,N} \quad s_{NLoS,N} \,]$$

To illustrate, consider a simplified case of two users and 10 transceiver pairs at the AP, the matrix S may have the following theoretical values:

$$s = [s_{LoS,1} s_{NLoS,1} s_{LoS,2} s_{NLoS,2}] = \begin{bmatrix} 0 & 0 & 0 & 0 \\ 0 & 0 & 0 & 0 \\ 0 & 0 & 0.8 & 0 \\ 0 & 0.3 & 0.4 & 0 \\ 0 & 0.4 & 0.3 & 0 \\ 0 & 0 & 0 & 0.4 \\ 0 & 0 & 0 & 0.3 \\ 0 & 0 & 0 & 0 \\ 0.9 & 0 & 0 & 0 \\ 0 & 0 & 0 & 0 \end{bmatrix} \begin{Bmatrix} TX_1 \\ TX_2 \\ TX_3 \\ TX_4 \\ TX_5 \\ TX_6 \\ TX_7 \\ TX_8 \\ TX_9 \\ TX_{10} \end{Bmatrix}$$

While $TX_4$ and $TX_5$ suffers from interference from signals. However, $TX_9$ is only linked with User 1 and $TX_3$, $TX_6$ and $TX_7$ are only linked with User 2. Through interrogating the matrix combined with identifiers for each user, activation can be linked specifically to a given user or users, reducing interference.

The retroreflector can optionally incorporate a system for encoding identifying information about its respective STA. For example, it can comprise an LCD shutter and associated drive circuitry to encode identifying information in the reflected signal.

Outline

The following features may be provided in certain embodiments. OWC system comprising:
  A first transceiver (AP) apparatus comprising:
    Multiple transmitters
    Multiple receivers
    Receivers located adjacent to one or more transmitters
  A second transceiver (STA) apparatus comprising:
    At least one transmitter
    At least one receiver
    At least one retroreflector
    The retroreflector, transmitter and receiver collocated on the mobile device
    The receiver on the stationary transceiver apparatus capable of receiving a signal transmitted by at least one of the transmitters on the stationary transceiver apparatus and retroreflected by the mobile transceiver apparatus retroreflector
    Based on channel characteristics and/or data of the retroreflected signal, activating and/or deactivating one or more of the transmitters of the stationary transceiver apparatus An OWC communication system comprising a first transceiver (AP) apparatus comprising:
  Multiple transmitters, wherein:
    The multiple transmitters are capable of performing spatial multiplexing AND diversity gain.

An OWC communication apparatus comprising a first transceiver (AP) comprising:
  Multiple transmitters, wherein:
    A subset of the multiple transmitters is directed toward a direct line of sight of a second OWC apparatus to provide a direct line of sight communication path and;

A subset of the multiple transmitters is directed toward a reflective surface to provide a non-direct line of sight communication path to a second OWC apparatus;

Provides angular diversity.

In other embodiments, the first (AP) transceiver apparatus may not be stationary.

Other features of the system may include but are not limited to:

AP
  Stationary
  MIMO
    Grid-of-Beam
  Networked
    To a LAN, WAN, internet
    Via wired, wireless, fibre-optics
    RF or optical
    Based on standard protocols
  Multiple APs
    In mesh network
AP Transmitter construction and function
  VCSELs, lasers, for the TX
  Narrow FoV, optionally 4°, optionally 2°
  Larger FoV/higher sensitivity/higher data rate/different construction for TXs directed toward most likely location of the STA
  Transmitting in IR at or in the region of 1550 nm, optionally 850 nm,
  MIMO/diversity Beam selection and combination/multiplexing
AP Receiver construction and function
  SPADs, APDs and/or PIN Diodes
  One to one pairing collocated between the RXs and TXs, optionally one to multiple RX to TXs pairing to reduce the number of RXs required.
  Capable of receiving two separate wavelengths, optionally notch filter, optionally filter with two regions
  Two receiver types:
    RXs for uplink higher sensitivity
    RXs capable of receiving AP TX wavelength collocated with the TXs and uplink RXs either more sparsely positioned, only positioned centrally or positioned outside or to the periphery of the AP TX array
  MIMO/diversity at AP (signal combiner)
Secondary transmission system
  walls and/or ceilings coated in material with a high reflectivity for the wavelength of the uplink and/or downlink
    IR-reflective paint, titanium dioxide white pigmented composite or 'cool' pigments of other colours that allow for visible light absorption while maintaining significant IR reflectivity.
    Smooth
    Reflectance of material such as paint optionally above 60%, optionally above 90%
  Positioning material highly reflective to the uplink and/or downlink wavelength ("mirrors") at specific locations
STA
  Located on HMD and/or ancillary VR devices or TV or other device
  More than one TRXRR grouping on HMD or device
    Providing coverage of FoV during motion/of likely position of AP(s)
  MIMO
    Active TRXRR based on retroreflected signal and/or RSSI at TRXRR of AP signal at one or more TRXRR grouping
  More than one STA associated with AP
Retroreflector
  Solid corner cube, optionally other types
  Comprising modulating apparatus
    (LCD) shutter and driver
  Comprising wavelength shifting material
    Shifting wavelength to uplink wavelength from downlink wavelength
Logic
  AP TXs switched on sequentially individually, optionally in subsets of total AP TXs
  AP TXs switched on starting in the direction most likely to be in FoV of STA
  RXs to measure power (RSSI) and/or low rate monitoring as the characteristic of the retroreflected signal to determine
  Activating TXs and/or RXs adjacent to RXs with power above a given threshold/Deactivating TXs and/or RXs adjacent to RXs with power below a given threshold.
    Maintaining activation around a given RX
  RXs optionally to decode/demodulate the retroreflected signal to identify the STA involved
  Beginning data transmission when target rate is achieved
    Continuing survey of TXs while data transmission is ongoing
  Monitoring uplink rate and/or retroreflected signal power and dynamically managing TX activity to track STA movement
Multiple APs networked wired/wirelessly within room
  Synchronising transmission between primary and secondary APs
  Shifting primary and secondary AP status based on characteristics of retroreflected signals
  Using one or more beams for 'backhauling', for example connecting AP's forming a meshed network.
Multiple TRX on STA
  Identifying primary and secondary TRX status based on characteristics of received signals
  MIMO/diversity at STA
Multiuser access and handover:
Intra-cell handover—i.e. seamless switching of the beams when the terminal moves, based on the retroreflected signals
Diversity combing by using one or more reflected signals
Interference mitigation when receiving signals at the AP at the same RX element from different user. This may inform the transmitter of the level of interference it would generate.
Benefits The system described above with reference to FIGS. 2, 3, 6a, 6b and 7 may have certain benefits.

The system may remove a requirement of beamsteering used by some state-of-the-art systems. The following are not required in the system of FIGS. 2, 3, 6a, 6b and 7: spatial light modulation (SLM), Microelectromechanical Systems (MEMS), coherence of beams, fibre connection to the AR. Moreover, GoB architecture enable MIMO which is not possible with beamsteering. Also, if two or more TX are transmitting, they can each carry independent data.

Benefits of Retro Reflector vs Detect and Retransmit

Key advantages may include:

Achieving channel reciprocity;

Enabling spatial signal processing and beam selection without an explicit uplink channel.

An advantage of using a retroreflector is most obvious in the initial setup of the link and when the STA is mobile. If the transit time of a light beam is assumed negligible, detection time is t and rise time of retransmission is r, the total time to detect a returning beam retroreflector is equal to t while the total time to detect a returning beam re-transmitter is equal to 2t+r.

r may be a few nanoseconds if it's a simple hardware triggered canned response, or up to a few hundred microseconds for a decode and retransmit which may be used to report signal strength or quality back to transmitter. Either way, the re-transmit may takes at least twice as long but more likely an order of magnitude longer.

How the Retroreflector is Used

In some circumstances, using the retroreflector, no information is returned as to the identity of the mobile station. However, the retroreflector may determine the number of mobile station in conjunction with an appropriate beam activation protocol. The AP device may also be able to identify which beams have a receiver at the other end and infer a path loss from the returned signal strength of each beam. Future intelligent algorithms may learn indirectly from the pattern of returned beams how many stations are present and predict which beams correspond to which stations. The retroreflector may also incorporate simplified modulation, for example an LCD shutter and associated driver circuitry to encode identifying data into the retroreflected signal.

Because a station is to be identified the retroreflector idea may not eliminate the scanning of beams and waiting for a retransmission, but it may considerably speed up the process.

With a large number of highly directional beams it may take hundreds of milliseconds to scan them all relying only on retransmissions. Using the reflectors, it may be possible to light up all the beams simultaneously or in blocks of multiple beams (if peak power is a concern or there is potential for overlap in adjacent returned signals) This means that within a few microseconds most of the beams may be eliminated from the scan.

Alternatively, a fast detect may be implemented just before a scheduled transmission and the transmission omitted if no reflection is detected.

The fast retro reflection detection process may be made continuous on the dark beams to detect changes in the reflected pattern, and therefore detect when a new station enters, or to rapidly detect movement of an existing station and initiate a soft handoff between beams to prevent a disconnection.

By using the retroreflector method in conjunction with active TX responses from the mobile station, the system latency may be reduced by a factor determined by the number of active beams divided by the total number of available beams.

System Overview and Specifications

It is envisaged that there are three classes of device in this network:

| General | | |
|---|---|---|
| Downlink | 20 Gbps | Maximum link rate |
| Uplink | >1 Gbps (optionally higher) | |
| Latency | <200 µs | |
| Maximum axis distance | >4 m (optionally higher) | For full downlink rate |
| Power consumption | TBC | No more power than 2xLiFi (for AP and STA) |
| Power Source | AP AC power supply STA battery powered | Mobile station beam selection power retroreflector = zero Mobile station beam selection power re-TX ~50-500 mw |

| Class of Device | Preferred Embodiments | |
|---|---|---|
| Primary Access Point | DOCSIS 3.1 cable modem and/or LAN connected gaming engine via thunderbolt 3 cable or 40 GB ethernet or USBC | Provides bridge to a wired network infrastructure. Separate communication channels for end points and secondary access points |
| Secondary Access Points | Reflectors with optional additional LiFi mesh network | Reflectors would be passive LiFi mesh network would enables connectivity to each other and end-point devices |
| End Point | One or more VR/AR HMDs and/or other consumer devices within a room. | Multiple end-point devices to share the download bandwidth. |

| | | IR preferred to allow use in dimmed or no |
|---|---|---|
| Channels | | light. wavelengths TBD |
| End-point device uplink | 1 Gbps IR_1 | |
| End-point device downlink | 20 Gbps IR_2 | |
| Peer-to-Peer Mesh | 20 Gbps IR_3 | Optional LiFi Mesh to augment reflectors |

Figure 8:
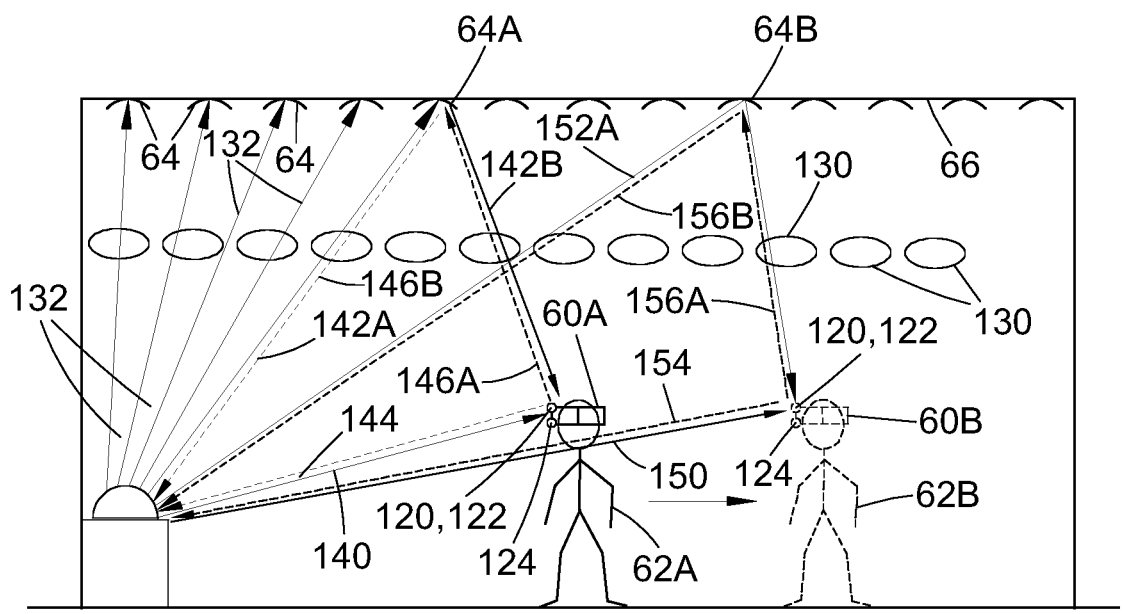
FIG. 8 is a schematic illustration of a Gbps cellular concept with passive reflectors which generate optical atto-cells in accordance with an embodiment.

FIG. 8 is a schematic illustration of a Gbps cellular concept with passive reflectors which generate optical attocells in accordance with an embodiment. FIG. 8 illustrates a user 62 moving between a first position and a second position. The user therefore moves between the coverage area of a first attocell and the coverage area of a second attocell.

In FIG. 8, an AP 50 comprising a grid-of-beams is positioned on a table 52. A plurality of reflectors 64 are positioned on a ceiling 66. FIG. 8 shows a plurality of reflectors 64 arrayed along a first dimension of the ceiling 66. In practice, reflectors 64 may also be arrayed along a second dimension of the ceiling 66, such as to provide coverage of a whole room. Each of the reflectors 64 provides a respective attocell 130.

The user 62 is illustrated in a first position in the room (user 62A) and in a second position in the room (user 62B). The user wears a head-mounted display 60 which is shown as 60A when in the first position and as 60B when in the second position.

When the user 62A is in the first position, light transmitted from one or more of the transmitters of the AP 50 travels to the head-mounted display 60A via a first direct path 140 and via a first reflected path 142A, 142B. The first reflected path 142A, 142B is reflected from reflector 64A. Light reflected from the head-mounted display 60A returns via the same paths, which are shown as direct return path 144 and reflected return path 146A, 146B.

Light is also transmitted from other transmitters of grid-of-beams of the AP 50. Examples of transmitted light beams are shown in FIG. 8 as beams 132. A controller of the AP 50 determines which of the transmitted beams have been reflected from the head-mounted display 60A. The controller may activate or deactivate transmitters of the grid-of-beams based on the determining of which of the transmitted beams have been reflected from the head-mounted display 60A.

When the user 62B is in the second position, light transmitted from the AP 50 travels via a second direct path 150 and via a second reflected path 152A, 152B. The reflected path 152A, 152B is reflected from reflector 64B. Light reflected from the head-mounted display 60B returns via a direct return path 154 and reflected return path 156A, 156B.

When the user moves from the first position to the second position, the controller may change which transmitters of the grid-of-beams of the AP 50 are active.

A skilled person will appreciate that variations of the described embodiments are possible without departing from the invention. Accordingly, the above description of specific embodiments is provided by way of example only and not for the purposes of limitation. It will be clear to the skilled person that modifications may be made to the embodiments without departing from the scope of the invention.

The invention claimed is:

1. An optical wireless communication (OWC) system comprising:
   a first apparatus comprising a plurality of OWC first apparatus transmitters and a plurality of OWC first apparatus receivers;
   a second apparatus comprising at least one reflector; and
   a controller configured to control at least one of the OWC first apparatus transmitters or the OWC first apparatus receivers;
   wherein the controller is configured to process data representative of at least one OWC signal that is received by at least one of the OWC first apparatus receivers after having been transmitted by at least one of the OWC first apparatus transmitters and reflected by the at least one reflector; and
   the controller is configured to at least one of activate or deactivate at least one of the OWC first apparatus transmitters or OWC first apparatus receivers based on the processing of the data that is representative of the received at least one OWC signal,
   wherein the controller is configured to selectively activate the plurality of OWC first apparatus transmitters to provide at least one of a first mode of operation or a second mode of operation,
   wherein the first mode of operation comprises a spatial multiplexing mode in which different signals are sent substantially simultaneously using different ones of the OWC first apparatus transmitters; and
   wherein the second mode of operation comprises a diversity gain mode in which the same signal is sent using multiple ones of the OWC first apparatus transmitters.

2. The system according to claim 1, wherein the plurality of OWC first apparatus transmitters and the plurality of OWC first apparatus receivers are spatially distributed on the first apparatus as a plurality of units, each unit comprising at least one OWC first apparatus transmitter and at least one OWC first apparatus receiver.

3. The system according to claim 1, further comprising at least one passive reflector apparatus separate from the first apparatus and second apparatus, wherein
   the first apparatus is configured to transmit signals to the second apparatus via a first, direct transmission path using a first one or more of the OWC first apparatus transmitters; and
   the first apparatus is further configured to transmit signals to the second apparatus via a second, indirect transmission path in which the signal is reflected by the passive reflector apparatus to the second apparatus, wherein the first apparatus is configured to transmit the signals via the second transmission path using a second, different one or more of the OWC first apparatus transmitters.

4. The system according to claim 3, wherein the passive reflector apparatus is created or mounted on a wall or ceiling, the passive reflector apparatus comprising at least one of a mirror or a region of reflective paint.

5. The system according to claim 3, wherein the second apparatus further comprises a combiner configured to combine signals received via the first transmission path with signals received via the second transmission path.

6. The system according to claim 1, wherein:
   the controller is configured to control the first apparatus to transmit signals to the second apparatus using successive ones of the plurality of OWC first apparatus transmitters;
   at least one of the activating or deactivating of the at least one of the OWC first apparatus transmitters is based on the processing of data that is representative of reflected signals that were transmitted from successive ones of the plurality of OWC first apparatus transmitters; and
   the processing of the data comprises comparing reflected signals that were transmitted by different ones of the plurality of OWC first apparatus transmitters.

7. The system according to claim 1, wherein the second apparatus further comprises at least one second apparatus transmitter configured to transmit uplink OWC signals to the first apparatus and at least one second apparatus receiver configured to receive the at least one OWC signal from the first apparatus.

8. The system according to claim 1, wherein the OWC first apparatus receivers comprise a first type of OWC receiver configured to receive signals transmitted by the OWC first apparatus transmitters and reflected by the second apparatus, wherein the signals transmitted by the OWC first apparatus transmitters are transmitted over a first channel having a first wavelength; and a second, different type of OWC receiver configured to receive uplink signals transmitted by the second apparatus, wherein the uplink signals are transmitted over a second channel having a second wavelength.

9. The system according to claim 1, wherein the OWC first apparatus receivers are each configured to receive signals transmitted by the OWC first apparatus transmitters and reflected by the second apparatus, wherein the signals transmitted by the OWC first apparatus transmitters are transmitted over a first channel having a first wavelength, and to receive uplink signals transmitted by the second apparatus, wherein the uplink signals are transmitted over a second channel having a second wavelength.

10. The system according to claim 1, wherein the plurality of OWC first apparatus transmitters comprises a first type of OWC transmitters arranged in a first region of the first apparatus, and a second, different type of OWC transmitters arranged in a second region of the first apparatus, wherein the first type of OWC transmitters has a larger field of view than the second type of OWC transmitters.

11. The system according to claim 1, wherein at least one of the activating or deactivating of the at least one of the OWC first apparatus transmitters is in dependence on at least one characteristic of the at least one reflected OWC signal, the at least one characteristic comprising at least one of: power, signal strength, or RSSI (received signal strength indicator).

12. The system according to claim 1, wherein the at least one reflector is configured to convert signals from a first wavelength to a second wavelength on reflection.

13. The system according to claim 1, wherein the second apparatus comprises an encoding apparatus configured to encode identity information on signals reflected by the at least one reflector.

14. The system according to claim 1, further comprising at least one secondary apparatus, wherein the at least one secondary apparatus forms part of a mesh OWC network for transmission of data between devices using a mesh channel, the mesh channel having a third wavelength.

15. The system according to claim 1, wherein a field of view of each of the OWC first apparatus transmitters is less than 4°, optionally less than 2°.

16. The system according to claim 1, wherein the first apparatus comprises or forms part of a control unit for an artificial reality, mixed reality or augmented reality system; the second apparatus comprises or forms part of a mobile device for use in an artificial reality, mixed reality or augmented reality system; and the first apparatus is configured to deliver artificial reality, mixed reality or augmented reality content to the second apparatus.

17. The system according to claim 16, wherein the mobile device comprises a head-mounted display.

18. The system according to claim 1, wherein the first apparatus comprises one of an access point (AP) or a station (STA) and the second apparatus comprises the other of the AP or the STA.

19. The system according to claim 18, wherein the passive reflector apparatus is created or mounted on a wall or ceiling, the passive reflector apparatus comprising at least one of a mirror or a region of reflective paint.

20. The system according to claim 18, wherein the second apparatus further comprises a combiner configured to combine signals received via the first transmission path with signals received via the second transmission path.

21. An apparatus comprising:
a plurality of OWC transmitters;
a plurality of OWC receivers; and
a controller configured to control the OWC transmitters and/or OWC receivers;
wherein the controller is configured to process data representative of at least one OWC signal that is received by at least one of the OWC receivers after having been transmitted by at least one of the OWC transmitters and reflected by at least one reflector external to the apparatus; and
the controller is configured to at least one of activate or deactivate at least one of the OWC transmitters or OWC receivers based on the processing of the data that is representative of the received at least one OWC signal,
wherein the controller is configured to selectively activate the plurality of OWC transmitters to provide at least one of a first mode of operation or a second mode of operation,
wherein the first mode of operation comprises a spatial multiplexing mode in which different signals are sent substantially simultaneously using different ones of the OWC transmitters; and
wherein the second mode of operation comprises a diversity gain mode in which the same signal is sent using multiple ones of the OWC transmitters.

22. An optical wireless communication (OWC) method comprising:
transmitting by at least one of a plurality of OWC transmitters of a first apparatus an OWC signal;
reflecting by a reflector of a second apparatus the OWC signal;
receiving by at least one of a plurality of OWC receivers of the first apparatus the OWC signal;
at least one of activating or deactivating at least one of the OWC transmitters or OWC receivers of the first apparatus based on processing of data that is representative of the received OWC signal, and
selectively activate the plurality of OWC first apparatus transmitters to provide at least one of a first mode of operation or a second mode of operation,
wherein the first mode of operation comprising a spatial multiplexing mode in which different signals are sent substantially simultaneously using different ones of the OWC first apparatus transmitters, and
wherein the second mode of operation comprising a diversity gain mode in which the same signal is sent using multiple ones of the OWC first apparatus transmitters.

23. An optical wireless communication (OWC) system comprising:
a first apparatus comprising a plurality of OWC first apparatus transmitters and a plurality of OWC first apparatus receivers;
a second apparatus comprising at least one reflector; and
a controller configured to control at least one of the OWC first apparatus transmitters or the OWC first apparatus receivers;
wherein the controller is configured to process data representative of at least one OWC signal that is received by at least one of the OWC first apparatus receivers after having been transmitted by at least one of the OWC first apparatus transmitters and reflected by the at least one reflector;
the controller is configured to at least one of activate or deactivate at least one of the OWC first apparatus transmitters or OWC first apparatus receivers based on the processing of the data that is representative of the received at least one OWC signal;
at least one passive reflector apparatus;
the first apparatus is configured to transmit signals to the second apparatus via a first, direct transmission path using a first one or more of the OWC first apparatus transmitters; and
the first apparatus is further configured to transmit signals to the second apparatus via a second, indirect transmission path in which the signal is reflected by the passive reflector apparatus to the second apparatus, wherein the first apparatus is configured to transmit the signals via the second transmission path using a second, different one or more of the OWC first apparatus transmitters.

24. An optical wireless communication (OWC) system comprising:
  a first apparatus comprising a plurality of OWC first apparatus transmitters and a plurality of OWC first apparatus receivers;
  a second apparatus comprising at least one reflector; and
  a controller configured to control at least one of the OWC first apparatus transmitters or the OWC first apparatus receivers,
  wherein the controller is configured to process data representative of at least one OWC signal that is received by at least one of the OWC first apparatus receivers after having been transmitted by at least one of the OWC first apparatus transmitters and reflected by the at least one reflector;
  the controller is configured to at least one of activate or deactivate at least one of the OWC first apparatus transmitters or OWC first apparatus receivers based on the processing of the data that is representative of the received at least one OWC signal;
  the controller is configured to control the first apparatus to transmit signals to the second apparatus using successive ones of the plurality of OWC first apparatus transmitters;
  at least one of the activating or deactivating of the at least one of the OWC first apparatus transmitters is based on the processing of data that is representative of reflected signals that were transmitted from successive ones of the plurality of OWC first apparatus transmitters; and the processing of the data comprises comparing reflected signals that were transmitted by different ones of the plurality of OWC first apparatus transmitters.

25. An optical wireless communication (OWC) first apparatus comprising a plurality of OWC first apparatus transmitters and a plurality of OWC first apparatus receivers and a controller configured to control at least one of the OWC first apparatus transmitters or the OWC first apparatus receivers,
  wherein the controller is configured to process data representative of at least one OWC signal that is received by at least one of the OWC first apparatus receivers from a second OWC apparatus, and
  wherein the controller is configured to at least one of activate or deactivate at least one of the OWC first apparatus transmitters or OWC first apparatus receivers based on the processing of the data that is representative of the received at least one OWC signal,
  wherein the controller is configured to selectively activate the plurality of OWC first apparatus transmitters to provide at least one of a first mode of operation or a second mode of operation,
  wherein the first mode of operation comprises a spatial multiplexing mode in which different signals are sent substantially simultaneously using different ones of the OWC first apparatus transmitters, and
  wherein the second mode of operation comprising a diversity gain mode in which the same signal is sent using multiple ones of the OWC first apparatus transmitters.

* * * * *